(12) United States Patent
Awad et al.

(10) Patent No.: US 11,246,156 B2
(45) Date of Patent: Feb. 8, 2022

(54) COMMUNICATION SYSTEM

(71) Applicant: NEC Corporation, Tokyo (JP)

(72) Inventors: Yassin Aden Awad, Uxbridge (GB); Robert Arnott, London (GB)

(73) Assignee: NEC CORPORATION, Tokyo (JP)

( * ) Notice: Subject to any disclaimer, the term of this patent is extended or adjusted under 35 U.S.C. 154(b) by 540 days.

(21) Appl. No.: 15/564,582

(22) PCT Filed: Apr. 8, 2016

(86) PCT No.: PCT/JP2016/001950
§ 371 (c)(1),
(2) Date: Oct. 5, 2017

(87) PCT Pub. No.: WO2016/163126
PCT Pub. Date: Oct. 13, 2016

(65) Prior Publication Data
US 2018/0077722 A1 Mar. 15, 2018

(30) Foreign Application Priority Data

Apr. 10, 2015 (GB) .................................. 1506151

(51) Int. Cl.
H04W 74/00 (2009.01)
H04W 72/04 (2009.01)
H04L 1/18 (2006.01)

(52) U.S. Cl.
CPC ..... H04W 74/004 (2013.01); H04W 72/0413 (2013.01); H04W 72/0446 (2013.01); H04W 74/002 (2013.01); *H04L 1/1893* (2013.01)

(58) Field of Classification Search
CPC ............. H04W 74/004; H04W 74/002; H04W 72/0413; H04W 72/0446; H04L 1/1893
(Continued)

(56) References Cited

U.S. PATENT DOCUMENTS

2013/0083753 A1 4/2013 Lee et al.
2014/0301330 A1* 10/2014 Lee ................... H04W 74/0833
370/329

(Continued)

FOREIGN PATENT DOCUMENTS

CN 104272795 A 1/2015
WO 2013/127453 A1 9/2013

(Continued)

OTHER PUBLICATIONS

3GPP TS 22.368, V.13.1.0 (Dec. 2014), 3rd Generation Partnership Project; Technical Specification Group Services and System Aspects; Service requirements for Machine-Type Communications (MTC); Stage 1 (Release 13), Dec. 2014, pp. 1-26.

(Continued)

*Primary Examiner* — Chi Tang P Cheng
(74) *Attorney, Agent, or Firm* — Sughrue Mion, PLLC

(57) ABSTRACT

A communication system is disclosed in which communication devices communicate with a base station using radio frames made up of a sequence of subframes and a frequency band made up of frequency subbands. The base station identifies a subframe in which a broadcast message, carrying information for at least one communication device, is to be broadcast; transmits, in a control channel, in a frequency subband in a current subframe that precedes the identified subframe, control information to identify said subframe in which said broadcast message is to be broadcast; and transmits the broadcast message in the identified subframe.

22 Claims, 11 Drawing Sheets

(58) Field of Classification Search
USPC .......................................................... 370/329
See application file for complete search history.

(56) References Cited

U.S. PATENT DOCUMENTS

2014/0334372 A1* 11/2014 Vos ........................ H04W 48/10
370/312
2016/0219622 A1* 7/2016 Liu ........................ H04L 5/0089

FOREIGN PATENT DOCUMENTS

| WO | 2013/174263 A1 | 11/2013 |
| WO | 2014/003436 A1 | 1/2014 |

OTHER PUBLICATIONS

3GPP TS 36.213, V.12.5.0 (Mar. 2015), 3rd Generation Partnership Project; Technical Specification Group Radio Access Network; Evolved Universal Terrestrial Radio Access (E-UTRA); Physical layer procedures (Release 12), Mar. 2015, pp. 1-239.
3GPP TR 36.888, V.12.0.0 (Jun. 2013), 3rd Generation Partnership Project; Technical Specification Group Radio Access Network; Study on provision of low-cost Machine-Type Communications (MTC) User Equipments (UEs) based on LTE (Release 12), Jun. 2013, pp. 1-55.
3GPP TSG RAN Meeting #67, RP-150492, "Revised WI: Further Physical Layer Enhancements for MTC," Ericsson, Shanghai, China, Mar. 9-12, 2015, 9 pages.
3GPP TSG RAN WG1 Meeting #80bis, R1-151555, "Further details of Physical Downlink Control Channel for MTC," NEC, Belgrade, Serbia, Apr. 20-24, 2015, pp. 1-4.
3GPP TSG RAN WG1 Meeting #80, R1-150082, "Enhancements to RAR and paging for MTC," Intel Corporation, Athens, Greece, Feb. 9-13, 2015, 6 pages.
3GPP TSG RAN WG1 Meeting #80, R1-150096, "Common message transmission for Rel-13 low complexity UEs and UEs in enhanced coverage," CATT, Athens, Greece, Feb. 9-13, 2015, 2 pages.
3GPP TSG RAN WG1 Meeting #79, R1-144820, "Considerations on common control messages for MTC enhancements," ZTE, San Francisco, US, Nov. 17-21, 2014, 7 pages.
3GPP TSG RAN WG1 Meeting #79, R1-144860, "Coverage enhancement for Rel-13 low complexity UEs," NEC, San Francisco, US, Nov. 17-21, 2014, pp. 1-4.
3GPP TSG RAN WG1 #68bis, R1-121654, "Impact of bandwidth on low-cost MTC UE procedures," Samsung, Jeju, Korea, Mar. 26-30, 2012, 3 pages.
Written Opinion on the International Searching Authority of PCT/JP2016/001950 dated Jul. 4, 2016.
International Search Report of PCT/JP2016/001950 dated Jul. 4, 2016.
Communication dated Mar. 19, 2020 from the China National Intellectual Property Administration in Application No. 201680021208.9.

* cited by examiner

[Fig. 1]
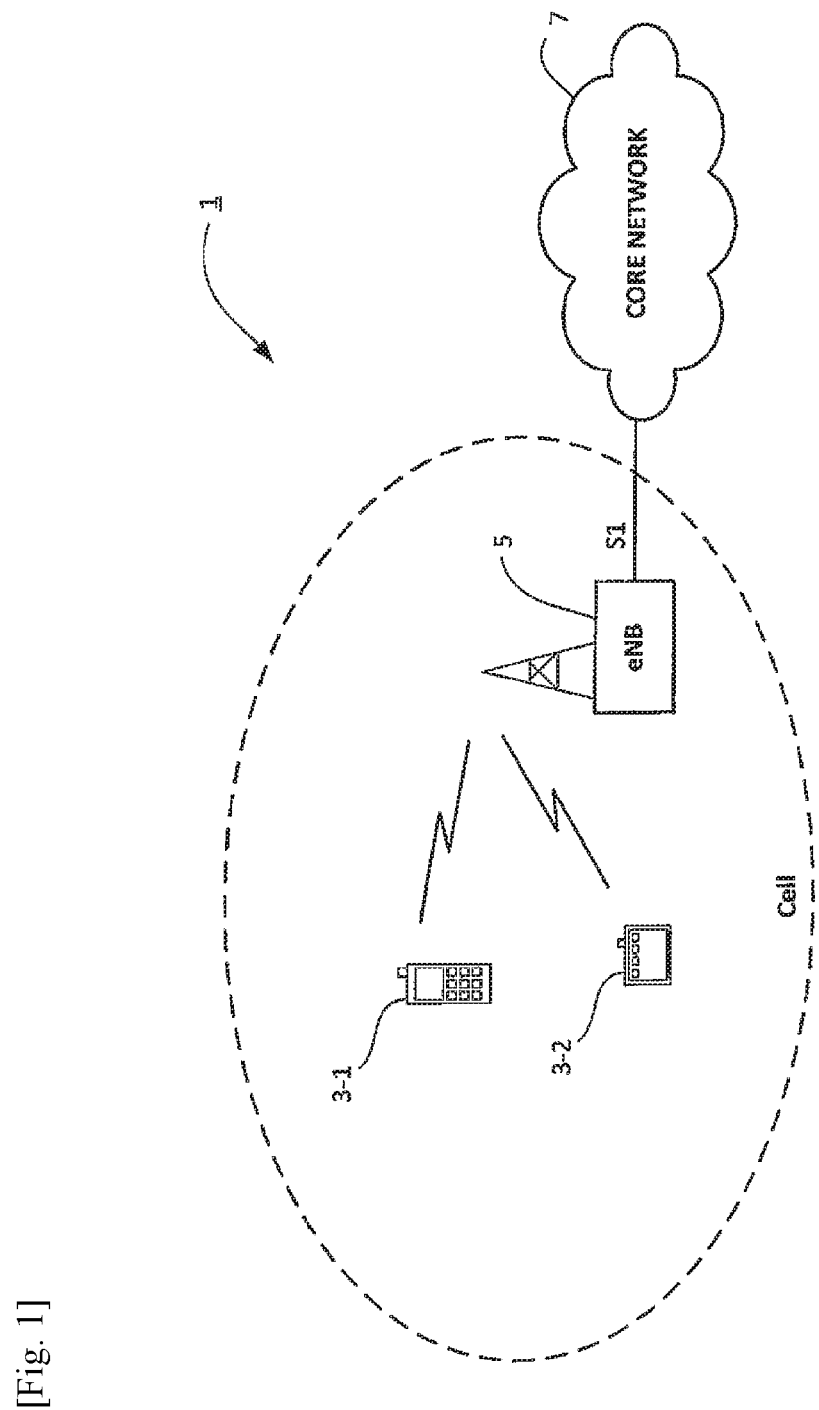

[Fig. 2]
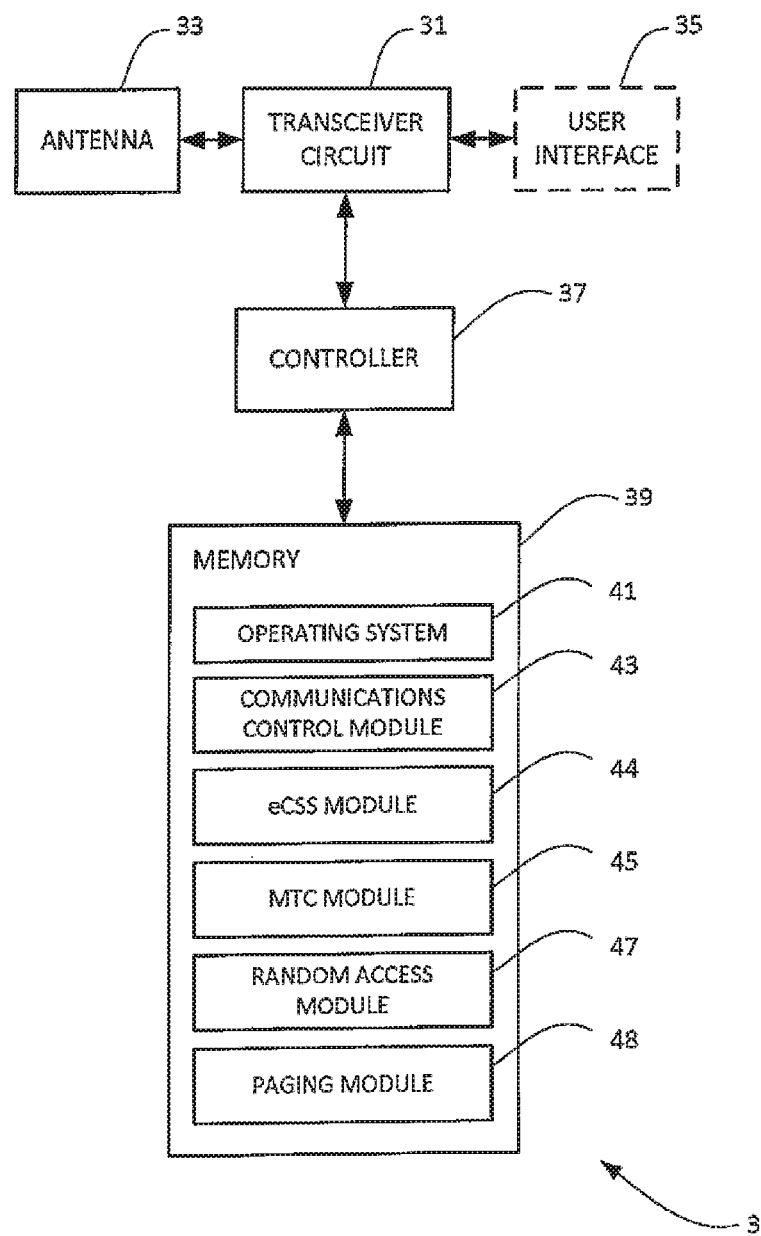

[Fig. 3]
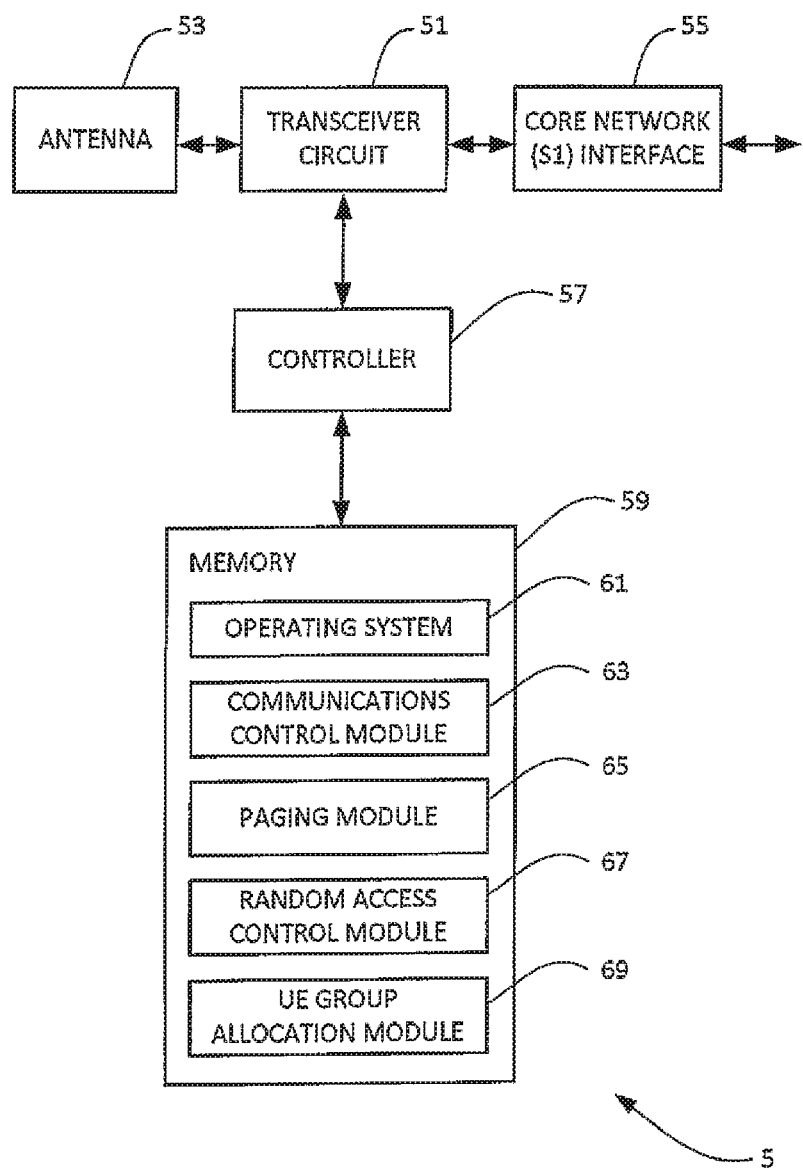

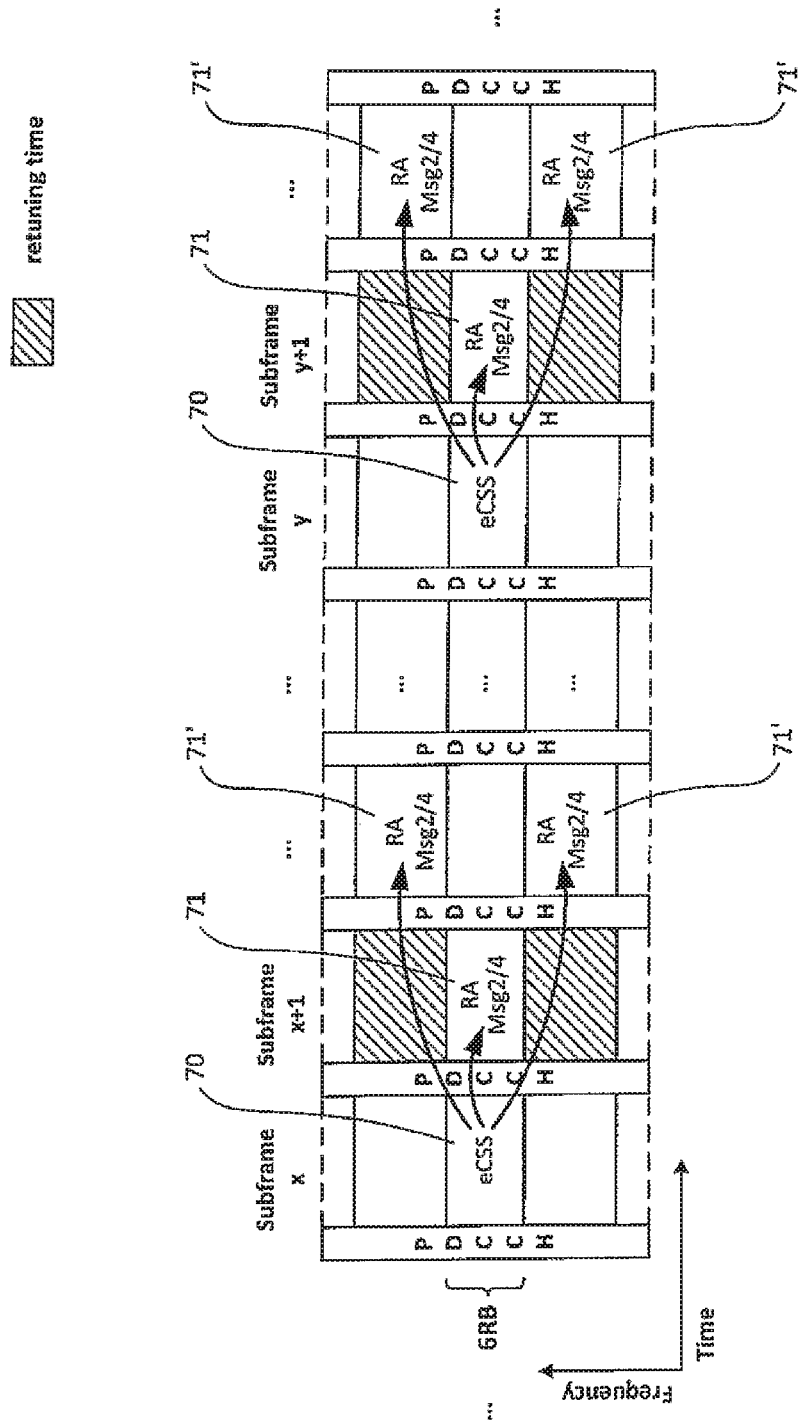
[Fig. 4]

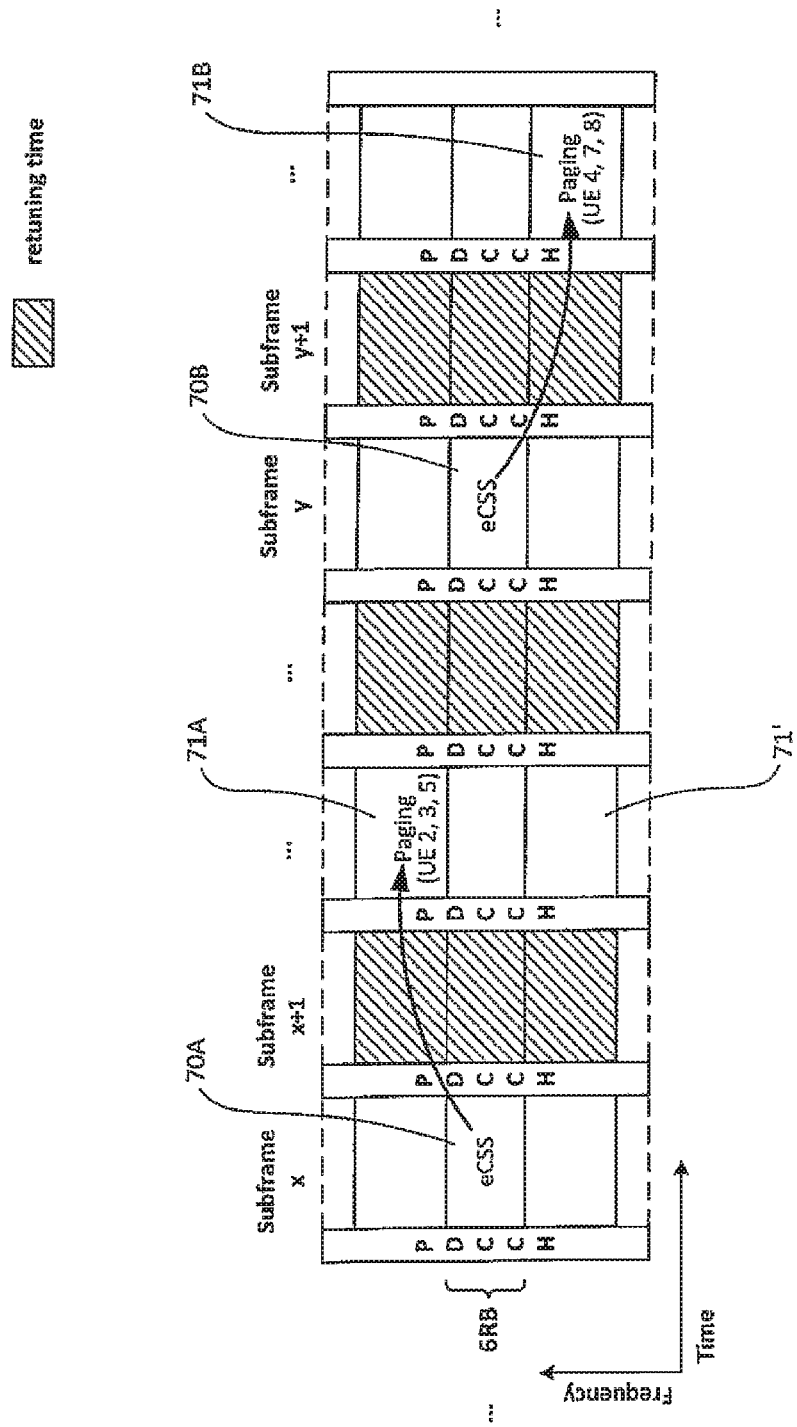
[Fig. 5]

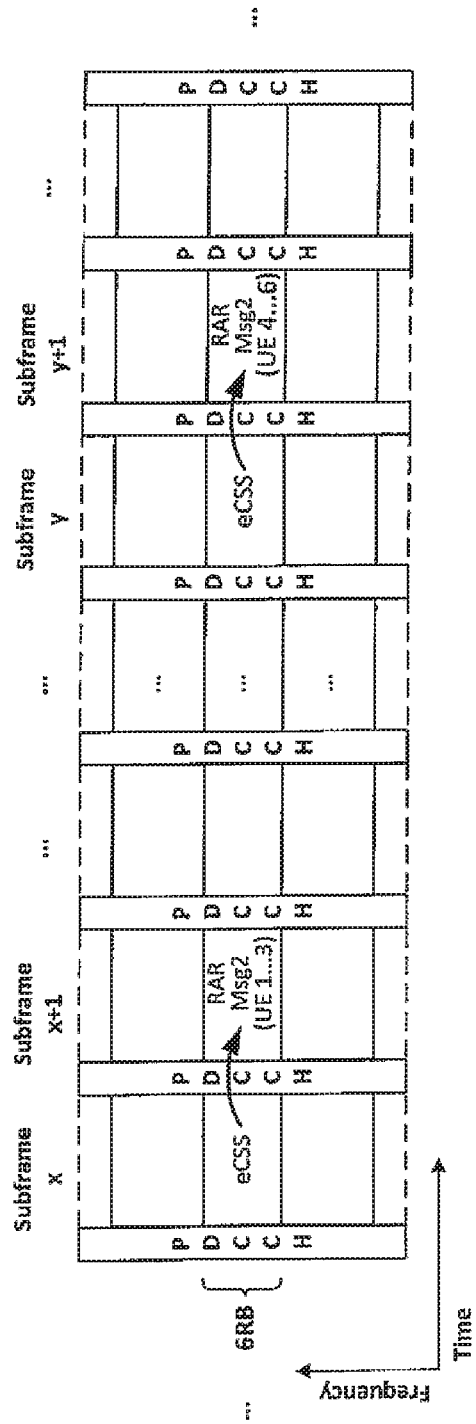
[Fig. 6]

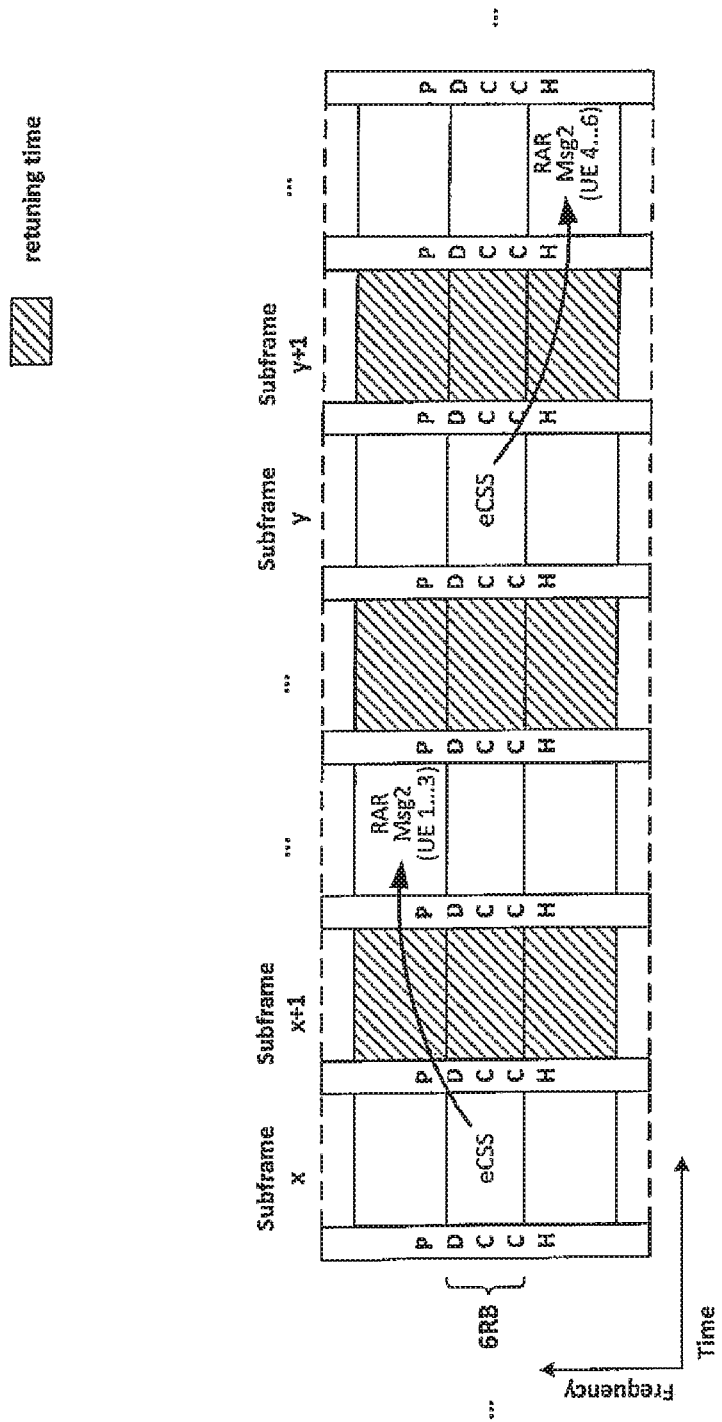
[Fig. 7]

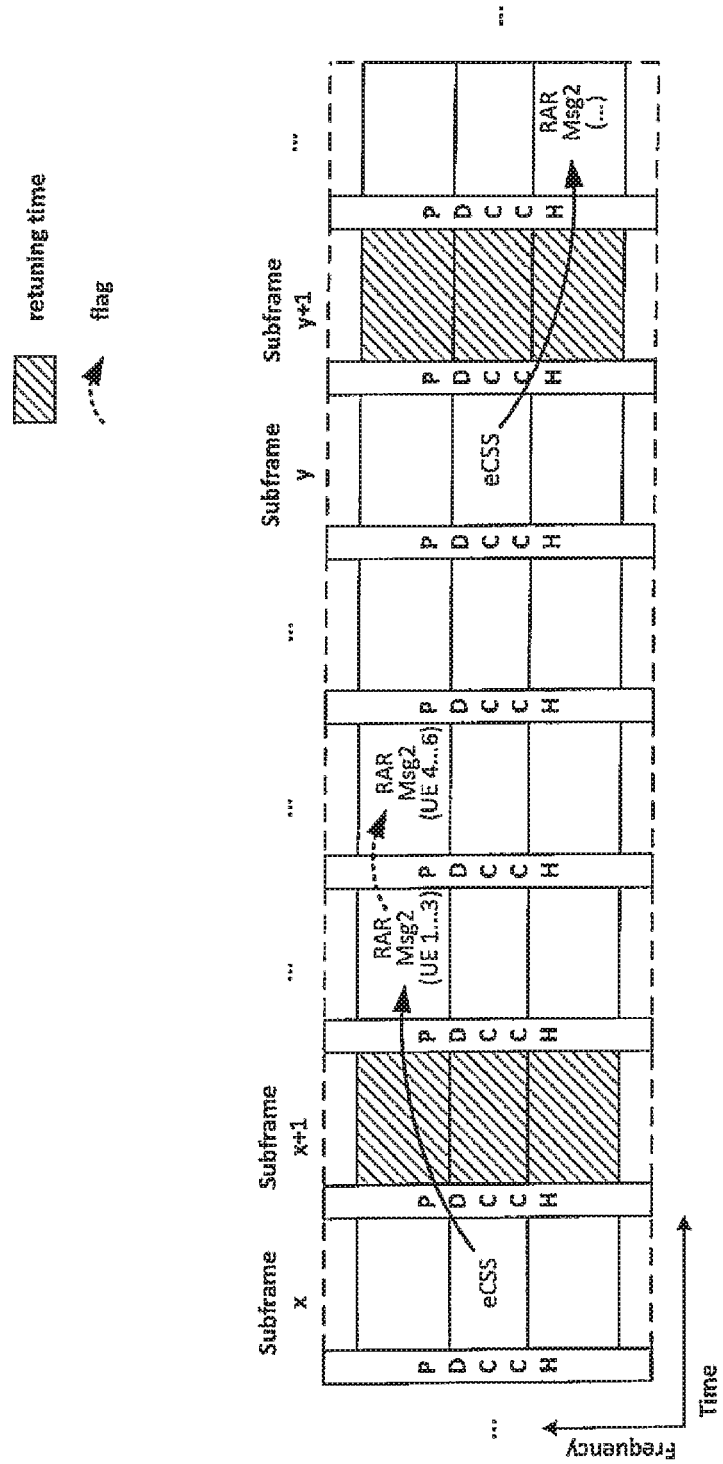
[Fig. 8]

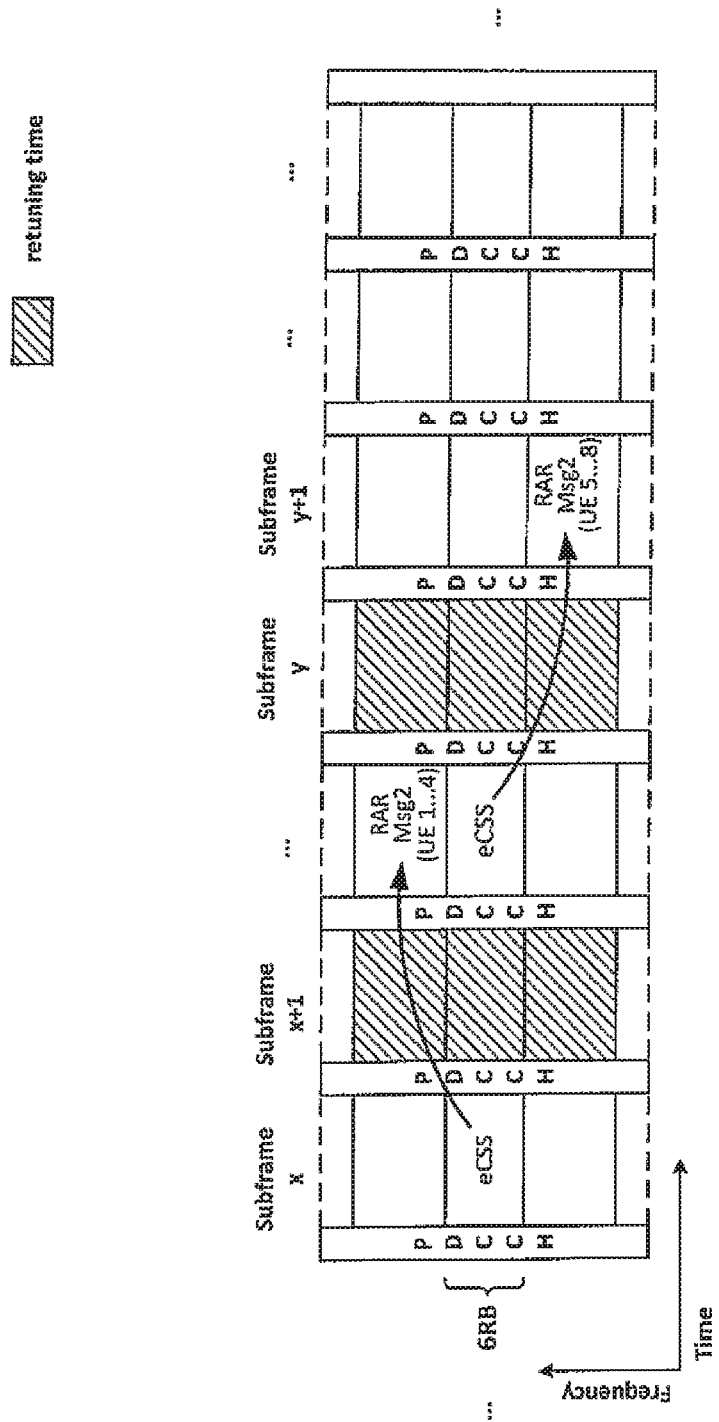
[Fig. 9]

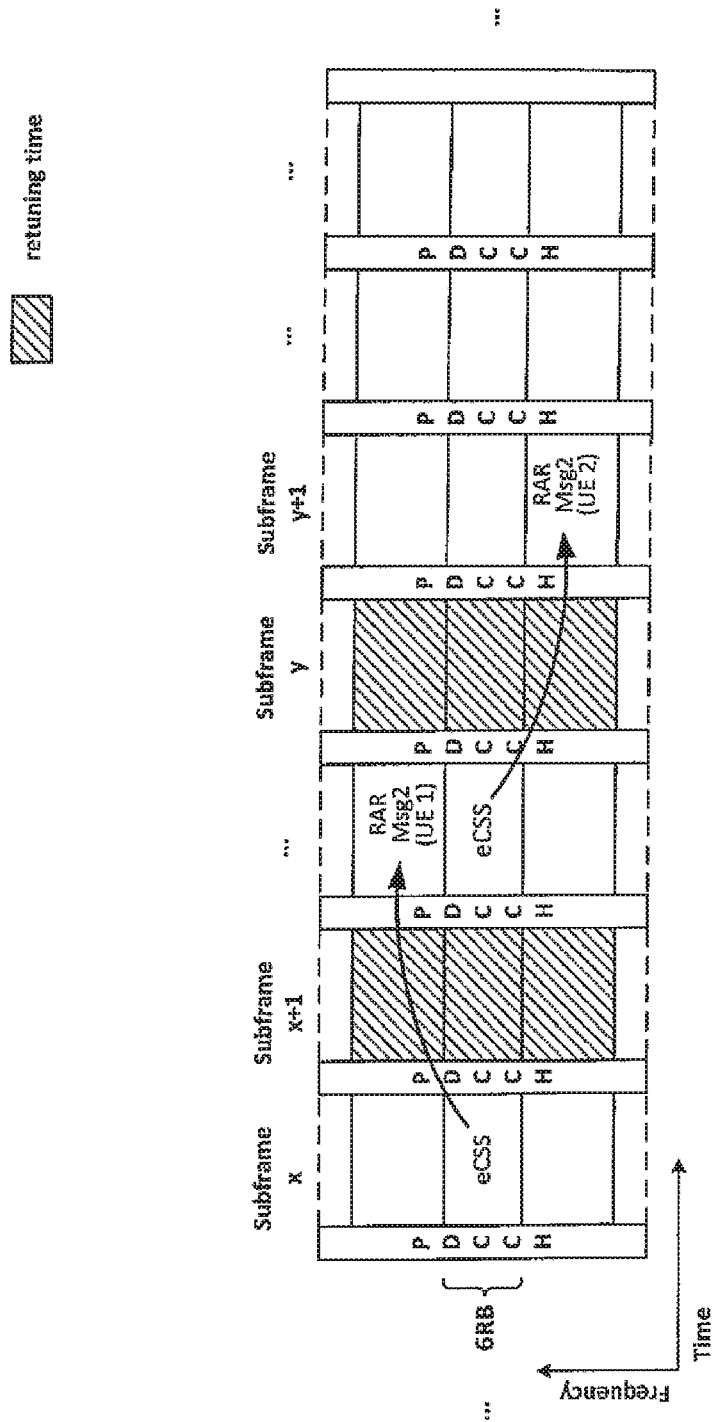

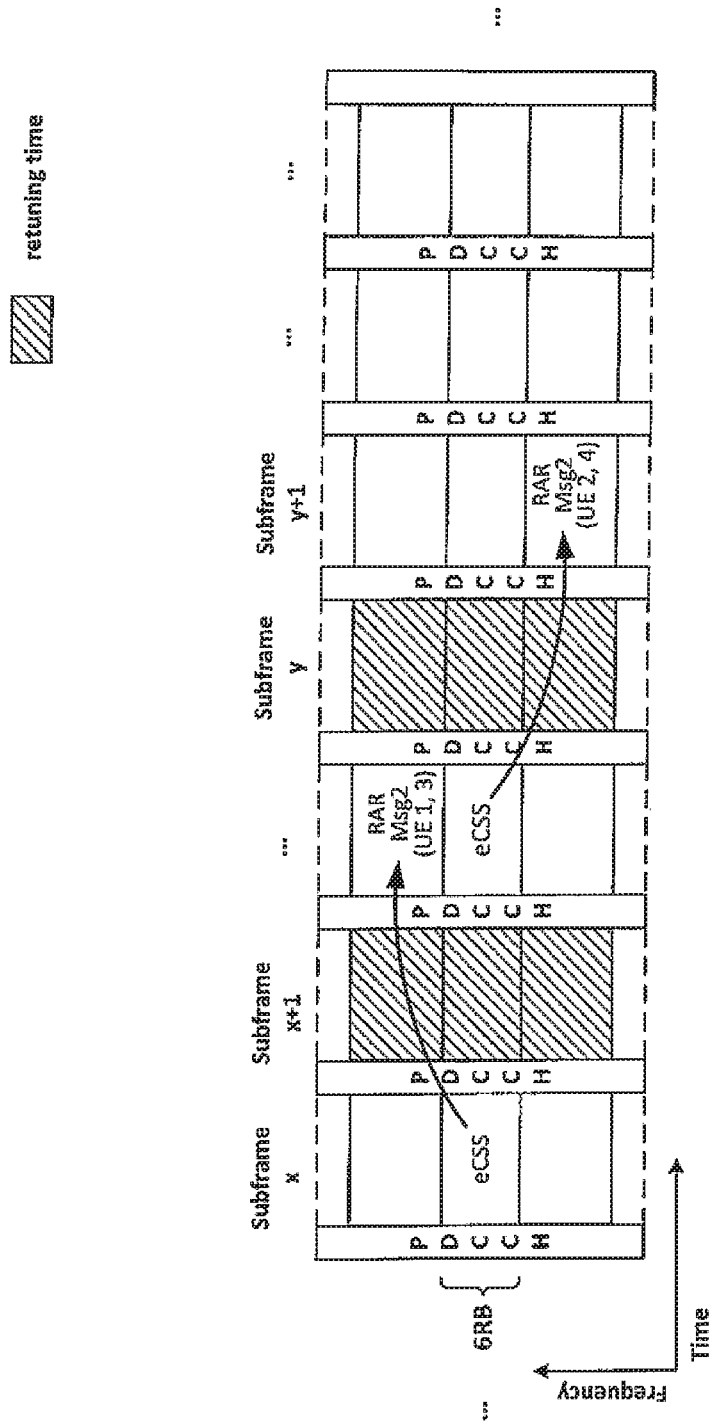
[Fig. 11]

COMMUNICATION SYSTEM

CROSS REFERENCE TO RELATED APPLICATIONS

This application is a National Stage of International Application No. PCT/JP2016/001950 filed Apr. 8, 2016, claiming priority based on British Patent Application No. 1506151.8 filed Apr. 10, 2015, the contents of all of which are incorporated herein by reference in their entirety.

TECHNICAL FIELD

The present invention relates to mobile communications devices and networks, particularly but not exclusively those operating according to the 3rd Generation Partnership Project (3GPP) standards or equivalents or derivatives thereof. The invention has particular although not exclusive relevance to the Long Term Evolution (LTE) of UTRAN (called Evolved Universal Terrestrial Radio Access Network (E-UTRAN)), including LTE-Advanced.

BACKGROUND ART

In a mobile (cellular) communications network, (user) communication devices (also known as user equipment (UE), for example mobile telephones) communicate with remote servers or with other communication devices via base stations. In their communication with each other, communication devices and base stations use licensed radio frequencies, which are typically divided into frequency bands and/or time blocks.

In order to be able to communicate via the base stations, communication devices need to monitor control channels operated by the base stations. One of these control channels, the so-called physical downlink control channel (PDCCH) and/or the so-called evolved PDCCH (EPDCCH) in Rel-13, carries the scheduling assignments and other control information. The (E)PDCCH serves a variety of purposes. Primarily, it is used to convey the scheduling decisions to individual communication devices, i.e. scheduling assignments for uplink and downlink communication.

The information carried on the (E)PDCCH is referred to as downlink control information (DCI). Physical control channels, such as the (E)PDCCH, are transmitted on an aggregation of one or several consecutive control channel elements (CCEs), where a control channel element corresponds to nine resource element groups (REGs). Each REG has four resource elements (REs).

Another control channel, the so-called physical random access channel (PRACH) is provided for synchronising transmissions between a communication device and the network (e.g. when setting up an initial access for the communication device and/or whenever re-synchronisation is necessary). In the current standard specification (from Rel-8), the resource (preamble, time, frequency) allocated to the PRACH is configured in advance and the applicable PRACH parameters are broadcast by the network as part of system information in the so-called System Information Block 2 (SIB2). One of the parameters specifies the so-called random access preamble, which consists of a cyclic prefix part and a sequence part. The length of the preamble (i.e. the overall length of the two parts combined) depends on the frame structure and the random access configuration.

When an idle mode communication device needs to communicate with other communication nodes, it needs to change its operation mode to the so-called radio resource control (RRC) connected mode (from RRC idle mode). In order to do so, the communication device performs a random access (RA) procedure with a suitable base station (e.g. a base station having the strongest signal and/or a base station that the communication device is authorised to use). The random access procedure includes the communication device selecting and transmitting to the base station (over the PRAM advertised via the SIB2) an appropriate preamble sequence along with a temporary identifier for identifying the communication device for the base station. The temporary identifier is also referred to as the random access radio network temporary identifier (RA-RNTI), which unambiguously identifies the time-frequency resource using which the communication device transmitted the random access preamble. If the communication device's transmission is received successfully, then the base station sends an appropriate random access response (in which the base station identifies the communication device using the received temporary identifier) and allocates resources for the communication device for communicating with the network.

Thus, once the base station responds to a preamble transmission by the communication device with an appropriate random access response (RAR), the communication device is able to request in its next message the establishment of an RRC connection (and/or the like) using the allocated resources. Once an RRC connection is established between the communication device and the base station, the communication device is able to communicate with other communication nodes via that base station (and via the core network) using the appropriate resources allocated to it by the base station.

Recent developments in telecommunications have seen a large increase in the use of machine-type communications (MTC) devices which are networked devices arranged to communicate and perform actions without human assistance. Examples of such devices include smart meters, which can be configured to perform measurements and relay these measurements to other devices via a telecommunication network. Machine-type communication devices are also known as machine-to-machine (M2M) communication devices.

MTC devices connect to the network (after performing an appropriate random access procedure, if necessary) whenever they have data to send to or receive from a remote 'machine' (e.g. a server) or user. MTC devices use communication protocols and standards that are optimised for mobile telephones or similar user equipment. However, MTC devices, once deployed, typically operate without requiring human supervision or interaction, and follow software instructions stored in an internal memory. MTC devices might also remain stationary and/or inactive for a long period of time. The specific network requirements to support MTC devices have been dealt with in the 3GPP technical specification (TS) 22.368 V13.1.0, the contents of which are incorporated herein by reference.

For the Release 13 (Rel-13) version of the standards relating to MTC devices, support for a reduced bandwidth of 1.4 MHz in downlink and uplink is envisaged. Thus, some MTC devices will support only a limited bandwidth (typically 1.4 MHz) compared to the total LTE bandwidth and/or they may have fewer/simplified components. This allows such 'reduced bandwidth' MTV devices to be made more economically compared to MTC devices supporting a larger bandwidth and/or having more complicated components. Beneficially, the EPDCCH is transmitted over a relatively narrow frequency spectrum (1.4 Mhz) that makes it compatible with Rel-13 reduced bandwidth MTC devices.

The lack of network coverage (e.g. when deployed indoors), in combination with the often limited functionality of MTV devices, can result in such MTC devices having a low data rate and therefore there is a risk of some messages or channels, such as the EPDCCH, not being received by an MTC device. In order to mitigate this risk, it has been proposed to increase the coverage of transmissions to support such MTC devices (e.g. corresponding to 20 dB for frequency division duplex (FDD) transmissions).

One approach proposed for the enhancement of coverage, for so-called 'coverage enhanced MTC devices', is the repetition of the same information (e.g. a DCI sent over the EPDCCH) across multiple subframes (e.g. two, three, or four subframes). In other words, for coverage enhanced (CE) MTC devices, the base station duplicates the transmitted information in the time domain (the base station retransmits the same information in one or more subframes subsequent to the subframe in which that information is first sent). Such a coverage enhanced MTC device can be configured to combine the multiple copies of the (same) information received in the multiple subframes, and after combining the received information, the coverage enhanced MTC device is more likely to be able to decode the received information successfully than based on a single copy of the transmitted information. Similarly to the repetition of the same information by the base station, coverage enhanced MTC devices are also configured to duplicate (in the time domain) information transmitted to the base station to facilitate successful reception of that information at the base station.

In practice, MTC devices may be deployed in different locations and they may experience different channel conditions. Therefore, the number of repetitions may need to be tailored for each device's situation or coverage level, and each MTC device informs its serving base station of the amount of coverage required (e.g. 5 dB/10 dB/15 dB/20 dB coverage enhancement) to allow the base station to adjust its control signalling appropriately.

SUMMARY OF INVENTION

Technical Problem

In the current 3GPP standards, so-called cross-subframe scheduling is supported for unicast physical downlink shared channel (PDSCH) transmissions, which makes it possible to send control data to a single MTC device in one subframe for scheduling transmissions for that MTC device in another (subsequent) subframe. However, such cross-subframe scheduling is relatively inflexible and limited.

Accordingly, the present invention seeks to provide systems, devices and methods which alleviate or at least partially ameliorate the above issues by providing improved cross-subframe scheduling.

In particular, the inventors have realised that it would be beneficial to provide cross-subframe scheduling for broadcast transmissions (such as RA messages 2, 4, and paging messages) as well, especially for MTC devices, and have conceived an efficient way of achieving such cross-subframe scheduling for broadcast transmissions. However, such cross-subframe scheduling not currently possible for broadcast transmissions, is not trivial, and cannot be achieved by simply re-using the existing procedures available for unicast transmissions over the PDSCH. This is especially true for MTC devices, which might operate over a limited bandwidth and hence they cannot receive both the control data (in one subframe) relating to a scheduled broadcast transmission and monitor the associated broadcast transmissions (such as a RAR or paging message) in the same or in another subframe. A further problem primarily associated with MTC devices is that since all MTC devices are allocated the same PRACH resources, the same temporary identifier may be used by more than one MTC device (since the RA-RNTI is derived from the PRACH resource used for sending the first message of the random access procedure). Consequently, the base station may be required to transmit associated RAR messages with the same RA-RNTI across different subframes (in time) and over different resource blocks in order to be able to respond to each MTC device within the prescribed time window. However, MTC devices (due to their limited bandwidth and low complexity) are unable to concurrently monitor all possible subframe and resource block combinations in order to check for their own preamble sequence ID in the RAR messages having their (common) RA-RNTI.

Solution to Problem

In one aspect, the invention provides a mobile station which communicates with a base station, the mobile station comprising; means for receiving a first parameter and a second parameter; means for transmitting a first message; means for receiving a control channel based on the first parameter and the second parameter; and means for decoding a downlink shared channel associated with the control channel based on information in the control channel, wherein the first parameter is related to at least one sub-frame to receive the control channel, wherein the second parameter is related to at least one narrow band to receive the control channel.

In one aspect, the invention provides a base station which communicates with a mobile station, the base station comprising; means for transmitting a first parameter and a second parameter; means for receiving a first message; means for transmitting a control channel based on the first parameter and the second parameter; and means for transmitting a downlink shared channel associated with the control channel based on the control part of the first message, wherein the first parameter is related to at least one sub-frame to receive the control channel, wherein the second parameter is related to at least one narrow hand to receive the control channel.

Aspects of the invention extend to corresponding computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Exemplary embodiments of the invention will now be described by way of example only with reference to the attached figures in which:

BRIEF DESCRIPTION OF DRAWINGS

FIG. 1 schematically illustrates a telecommunication system to which embodiments of the invention may be applied;

FIG. 2 is a block diagram illustrating the main components of the communication device shown in FIG. 1;

FIG. 3 is a block diagram illustrating the main components of the base station shown in FIG. 1;

FIG. 4 illustrates exemplary ways in which random access related transmissions (with cross-subframe scheduling) can be realised in the system shown in FIG. 1;

FIG. 5 illustrates an exemplary way in which paging transmissions (with cross-subframe scheduling) can be employed in the system shown in FIG. 1;

FIG. 6 illustrates a modification of the random access related transmissions shown in FIG. 4;

FIG. 7 illustrates another modification of the random access related transmissions shown in FIG. 4;

FIG. 8 illustrates another modification of the random access related transmissions shown in FIG. 4;

FIG. 9 illustrates another modification of the random access related transmissions shown in FIG. 4;

FIG. 10 illustrates another modification of the random access related transmissions shown in FIG. 4; and FIG. 11 illustrates another modification of the random access related transmissions shown in FIG. 4.

DESCRIPTION OF EMBODIMENTS

<Overview>

FIG. 1 schematically illustrates a mobile (cellular) telecommunication system 1 in which communication devices 3 (such as mobile telephone 3-1 and MTC device 3-2) can communicate with each other and/or with other communication nodes via an E-UTRAN base station 5 (denoted 'eB') and a core network 7. As those skilled in the art will appreciate, whilst one mobile telephone 3-1, one MTC device 3-2, and one base station 5 are shown in FIG. 1 for illustration purposes, the system, when implemented, will typically include other base stations and communication devices.

The base station 5 is connected to the core network 7 via an S1 interface. The core network 7 includes, amongst others: a gateway for connecting to other networks, such as the Internet and/or to servers hosted outside the core network 7; a mobility management entity (MME) for keeping track of the locations of the communication devices 3 (e.g. the mobile telephone and the MTC device) within the communication network 1; and a home subscriber server (HSS) for storing subscription related information (e.g. information identifying which communication device 3 is configured as a machine-type communication device) and for storing control parameters specific for each communication device 3.

Each communication device 3 may fall into one or more categories of UEs. A first category of UEs include communication devices that support only an earlier release of the LTE standard (e.g. Rel-8, Rel-9, Rel-10, Rel-11, and/or Rel-12). Such communication devices are commonly referred to as legacy UEs (assuming that the base station 5 is operating in accordance with Rel-13 of the LIE standards). It will be appreciated that some communication devices that belong to this category may not support the EPDCCH (only PDCCH). A second category of UEs include communication devices that support the current release of the LTE standard (e.g. Rel-13 and/or later). A third category of UEs include reduced bandwidth UEs (e.g. Rel-13 MTC devices capable of using a 1.4 Mhz bandwidth only), which are not able to communicate over the entire bandwidth available in the cell of the base station 5. A fourth category of UEs includes coverage enhanced UEs (e.g. some MTC devices), which require certain base station functionalities to be simplified and/or relaxed (although such coverage enhanced UEs may support other functionalities as normal).

In this example, the mobile telephone 3-1 comprises a Rel-13 UE, and the MTC device 3-2 comprises a reduced bandwidth MTC device (which may also be configured for an appropriate level of coverage enhancement). Although not shown in FIG. 1, it is assumed that a number of other MIC devices are also present within the cell of the base station 5.

The base station 5 is configured to transmit a physical downlink control channel (PDCCH) and an evolved PDCCH (EPDCCH) for reception by the communication devices 3 located within the base station's 5 cell. The (E)PDCCH allocates uplink and downlink resources to the communication devices 3. One difference between the PDCCH and the EPDCCH is that the EPDCCH uses a relatively narrow frequency spectrum (1.4 Mhz) that makes it compatible with Rel-13 reduced bandwidth MTC devices, whilst PDCCH uses a wider frequency spectrum in order to provide backward compatibility with legacy communication devices.

The so-called common search space (CSS) carries downlink control information (DCI) in the cell which is common to all communication devices 3. For example, the CSS may include: system information blocks (SIBS) which contain information related to cell access parameters; random access channel (RACH) messages (e.g. a Random Access Response (RAR) and/or Contention Resolution); and/or the paging channel (PCH). In LTE Rel-13, the CSS (also referred to as 'eCSS') forms part of the EPDCCH. The (time-frequency) resources allocated for the CSS may be indicated via the so-called physical broadcast channel (PBCH) or via system information block #1 (SIB1).

Due to the reduced bandwidth of 1.4 MHz in downlink and uplink, the MTC device 3-2 cannot receive the PDCCH which is densely spread across the entire cell bandwidth (i.e. it may be transmitted over frequencies falling outside the 1.4 MHz supported by the MTC device 3-2). However, the MTC device 3-2 can receive the EPDCCH CSS (eCSS) which is transmitted over 6 RBs, i.e. within the 1.4 MHz band supported by the MTC device 3-2.

Furthermore, the base station's 5 bandwidth includes a number of subbands (e.g. non-overlapping subbands), each subband having 6 RBs (or less). Beneficially, since bandwidth reduced MTC devices are able to communicate over a maximum of 1.4 MHz bandwidth (which roughly corresponds to 6 RBs), the communication device 3-2 is able to send and receive (eCSS and other) data over the particular subband that its transceiver is currently tuned to. Advantageously, the base station 5 has some scheduling flexibility in the frequency location by being able to select an appropriate subband for communicating paging/RAR messages (and/or the like) to the communication devices 3 within its cell.

In order to achieve such scheduling flexibility, the base station 5 transmits control data via the eCSS in a subband of a particular subframe, and the control data includes information (DCI) which informs communication devices 3 in the base station's 5 cell that random access/paging transmission is scheduled (and for which communication device(s) 3) in a subsequent subframe.

Thus, effectively, the eCSS (in the EPDCCH) comprises a common search space for dynamic scheduling of random access (RA) messages (which are transmitted over the PDSCH). In this case, DCI format transmitted via the eCSS includes the number of physical resource blocks (PRBs), transport block size (TBS), frequency locations (and/or the like) associated with the RA message scheduled via that DCI format.

Communication devices 3 within the base station's 5 cell are configured to monitor the control information transmitted via the eCSS in order to determine whether any RA/paging transmission is scheduled for them.

However, whilst the base station 5 is typically configured to transmit the eCSS on a subband located around the central portion of the base station's bandwidth (i.e. a subband allocated to the EPDCCH), RA/paging messages may be (and often need to be) transmitted over a different subband (e.g. over a channel, such as the PDSCH, that is allocated to a different subband to the EPDCCH subband).

Therefore, when employing cross-subframe scheduling, the base station 5 is advantageously configured to indicate via the eCSS (using an appropriately formatted DCI) which subsequent subframe and which subband will carry the RA/paging message for which communication device(s) 3. For RAR Message 2, communication devices 3 sharing the same RA-RNTI (e.g. MTC devices that initiated a random access procedure using the same PRACH resources) are grouped into a number of different groups (at least for the given scheduling round). For each group of communication devices, the base station 5 schedules the associated RA/paging message such that an appropriate 'retuning time' is included between the transmission of the eCSS scheduling a particular RA/paging message (in one sub-frame), and the transmission of the corresponding RA/paging message (in a subsequent subframe). The appropriate retuning time is determined in such a way that if the eCSS and the RA/paging message are transmitted over the same subband, then the retuning time is effectively zero subframes, and if the eCSS and the RA/paging message are transmitted over different subbands, then the retuning time is one subframe (although it may also be set to more than one subframe, if appropriate).

Thus, for example, if the RA/paging message for a given communication device 3 in a particular group is scheduled for transmission over a different subband to the subband carrying the eCSS, then the base station 5 schedules the RA/paging message (via the associated DCI) such that a retuning time of at least one subframe is provided between transmission of the eCSS and transmission of the RA/paging message scheduled by (the DCI included in) the eCSS. Such retuning time of one subframe makes it possible for the scheduled communication device 3 to timely tune its transceiver to the subband carrying the RA/paging message (from the subband carrying the eCSS).

Similarly, if the RA/paging message for a communication device 3 of a given group is scheduled for transmission over the same subband as the subband carrying the eCSS (but in a different subframe), then the base station 5 schedules the RA/paging message such that a retuning time of zero subframes is provided between transmission of the eCSS and transmission of the RA/paging message (since the scheduled communication device's 3 transceiver is already tuned to the correct subband carrying the RA/paging message).

In other words, the base station 5 employs a cross-subframe scheduling (at least for MTC devices) in which an associated retuning time is dependent on: the group of communication devices for which the broadcast transmission is scheduled; and/or the subband used for transmitting the control information (eCSS) and the subband carrying the broadcast message scheduled by that control information.

Moreover, paging messages are transmitted in this system separately for MTC devices (e.g. low-complexity and/or coverage enhanced MTC devices) and for other communication devices. Paging messages for MTC devices support PDSCH subframe bundling/repetition with multiple bundle sizes/repetition levels (in accordance with the required level of coverage enhancement). Beneficially, the base station 5 paging the communication device 3-2 has knowledge that the communication device 3-2 comprises a low-complexity (bandwidth reduced) MTC device and/or an MTC device configured for coverage enhancement. The base station 5 also has knowledge of the amount of coverage enhancement (repetitions) required during paging message transmission.

Similarly, RAR messages (i.e. message 2) for MTC devices are also transmitted separately from RAR messages for other communication devices. Furthermore, in this system, multiple RAR messages can be multiplexed for a plurality of communication devices (e.g. that belong to the same group). Beneficially, when multiplexing is used, each multiplexed message includes RAR messages for those communication devices (of the respective group) that are operating with the same level of coverage enhancement.

In more detail, a number of RAR messages can be multiplexed together (e.g. similarly to multiplexing employed in Rel-8) into one unit of TBS. The exact transport block size (i.e. the number of bits transferred in a 1 ms transport block size) is dependent on the modulation and coding scheme (MCS) and the number of resource blocks assigned to the communication device. Details of how the exact TBS can be derived are given in section 7.1.7 of 3GPP TS 36.213 V12.5.0, the contents of which are included herein by reference.

Beneficially, the base station 5 may be configured to control the number of messages that are being multiplexed, and include in each multiplexed transmission only such messages that need to be transmitted with the same level of coverage enhancement (e.g. multiplex RAR messages for such MTC devices that are configured with the same CE level). For example, RAR messages for low-complexity MTC devices in normal coverage may be multiplexed into a first RAR message (that does not require repetition) and RAR messages for MTC devices configured for (a particular level of) CE may be multiplexed into a different RAR message (with repetitions as appropriate).

It will also be appreciated that the base station may multiplex RAR messages intended only for a first set of MTC devices (for example, MTC devices in normal coverage) and to transmit conventional (non-multiplexed) RAR messages for a second set of MTC devices (such as CE mode MTC devices and/or MTC devices configured with a particular CE level, e.g. 5 dB, 10 dB, and/or 15 dB).

It will be appreciated that when multiple messages are multiplexed, the resulting payload increases (and depending on the applicable CE level, the number of repetitions in time domain may also increase). Beneficially, however, the above described dynamic cross-subframe scheduling (using eCSS to indicate TBS size and assigned PRB resources)—preferably in combination with grouping of communication devices—can be employed to compensate for a potential payload increase resulting from multiplexing of multiple messages, without requiring the MTC devices to monitor both the eCSS and each RAR/paging transmission at the same time (which may be transmitted over different 1.4 MHz subbands).

In summary, the base station is advantageously able to indicate to MTC devices within its cell the resources used for their associated broadcast transmissions (e.g. RA and/or paging message transmissions), and schedule broadcast transmissions in such a way (e.g. only after an appropriate retuning time and/or only for a given group) that even limited bandwidth MTC devices can receive their associated broadcast transmissions. In other words, the base station ensures that it responds to each communication device's preamble transmission using communication resources that the respective communication device is able to use in the particular subframe in which the associated RAR message is transmitted. Similarly, the base station is configured to page each communication device in a subframe in which that communication device's transceiver is tuned (or can be tuned) to the communication resources carrying the associated paging message.

<Communication Device>

FIG. 2 is a block diagram illustrating the main components of the communication device 3 shown in FIG. 1. The communication device 3 may be an MTC device or a mobile (or 'cellular') telephone configured as a machine-type communication device. The communication device 3 comprises a transceiver circuit 31 which is operable to transmit signals to, and to receive signals from, the base station 5 via at least one antenna 33. Typically, the communication device 3 also includes a user interface 35 which allows a user to interact with the communication device 3, however this user interface 35 may be omitted for some MTC devices.

The operation of the transceiver circuit 31 is controlled by a controller 37 in accordance with software stored in memory 39. The software includes, among other things, an operating system 41, a communication control module 43, an eCSS module 44, an MTC module 45, a random access module 47, and a paging module 48.

The communication control module 43 controls communications between the communication device 3 and the base station 5 and/or other communication nodes (via the base station 5). The communication control module 43 also ensures that the transceiver 31 is tuned to the subband/frequency (e.g. it remains tuned to the same subband or it is timely re-tuned to a different subband) associated with the communication resources scheduled/allocated for this communication device 3.

The eCSS module 44 monitors eCSS transmissions by the base station 5 and determines whether the eCSS transmissions include information indicating that cross-subframe broadcast transmissions are being scheduled for the communication device 3, and determines the communication resources (e.g. subframe/subband) associated with such broadcast transmissions. It appropriate, the eCSS module 44 notifies the communication control module 43 to (re-)tune the transceiver 31 to the frequency/subband indicated via the eCSS.

The MTC module 45 is operable to carry out machine-type communication tasks. For example, the MTC module 45 may collect data for sending (e.g. periodically and/or upon detecting a trigger) to a remote server (via the transceiver circuit 31).

The random access module 47 is responsible for obtaining and maintaining synchronisation of transmissions with the network. For example, the random access module 47 may send (via the transceiver circuit 31) a random access transmission (including a selected preamble sequence) to the base station 5 when the communication device 3 needs to establish an RRC connection with the network. The random access module 47 receives a random access response from the base station 5 (using the communication resources determined by the eCSS module 44).

The paging module 48 receives (over appropriate communication resources determined by the eCSS module 44) and processes paging messages addressed to the communication device 3.

<Base Station>

FIG. 3 is a block diagram illustrating the main components of the base station 5 shown in FIG. 1. The base station 5 comprises an E-UTRAN base station (eNB) comprising a transceiver circuit 51 which is operable to transmit signals to, and to receive signals from, the communication devices 3 via one or more antennas 53. The base station 5 is also operable to transmit signals to and to receive signals from a core network 7 via an appropriate core network interface 55 (such as an S1 interface). The operation of the transceiver circuit 51 is controlled by a controller 57 in accordance with software stored in memory 59.

The software includes, among other things, an operating system 61, a communication control module 63, a paging module 65, a random access control module 67, and a UE group allocation module 69.

The communication control module 53 controls communications with the communication devices 3. The communication control module 53 is also responsible for scheduling (via the eCSS) the resources to be used by the communication devices 3 served by this base station 5. Although not shown in FIG. 3, the communication control module 53 includes a broadcast portion which is responsible for broadcasting system information (such as configuration of the cell of the base station 5) and/or other broadcast transmissions for receipt by the communication devices 3 located within the cell of the base station 5. For example, the broadcast portion transmits the PRACH configuration(s) employed in the cell and/or the messages generated by the other modules (e.g. paging/RA messages).

The paging module 65 generates and transmits paging messages (via the communication control module 63) for communication devices 3 located within the cell of the base station 5.

The random access control module 67 is responsible for communications over the PRACH. The random access control module 67 handles (generates, sends, and receives) messages relating to the random access procedure performed with communication devices 3 located within the cell of the base station 5.

The UE group allocation module 69 allocates each communication device 3 to a group (and/or UE category) based on a parameter associated with the communication device 3 (for example, based on the received preamble sequence, e.g. the time/frequency resource the preamble sequence is sent on and/or the selected preamble). When appropriate, the UE group allocation module 69 notifies the communication control module 63 about each communication device's 3 allocated group/category so that the communication control module 63 can adjust the operation of its broadcast portion accordingly.

In the above description, the communication device 3 and the base station 5 are described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

<Operation—Random Access Procedure>

FIG. 4 illustrates exemplary ways in which random access messages (RA msg2/4) transmissions (with cross-subframe scheduling) can be employed in the communication system 1 shown in FIG. 1.

It will be appreciated that the base station 5 is configured to transmit a 'SIB2' in its cell for reception by the communication devices 3. The SIB2 includes the appropriate parameters for the PRACH resource configuration currently in use in the cell of the base station 5.

As explained above, the communication devices 3 need to establish an RRC connection with the base station 5 in order to be able to communicate with other devices via that base station 5 (and the core network 7). Therefore, each communication device 3 is configured to perform an appropriate random access procedure (via the PRACH) in order to synchronise their transmissions with the base station 5 and to indicate to the network the reason for establishing the RRC connection. In this cell, each type of communication device has its own set of PRACH parameters. Therefore, the resources allocated for initiating a random access procedure by the MTC device 3-2 are different to the resources allocated for the mobile telephone 3-1.

It will be appreciated that each MTC device may be configured to estimate (e.g. before initiating a random access procedure) an appropriate CE level (0-3) for that MTC device based on, for example, downlink signal quality measurements, such as reference signal received power (RSRP) measurements. Based on the estimated CE level, the MTC devices can determine the number of repetitions required when communicating messages of the random access procedure.

In summary, the random access procedure includes the following messages:

Message 1 ('Msg1'): the MTC device transmits a PRACH preamble sequence to the base station with appropriate time domain repetitions (if any);

Message 2 ('Msg2'): the base station transmits (broadcasts) a Random Access Response (with appropriate repetitions, if any) to the MTC device within a time window determined based on the subframe in which the MTC device's Msg1 was transmitted;

Message 3 ('Msg3'): the MTC device transmits its associated mobile terminal identity to the network (with appropriate repetitions, if any); and Message 4 ('Msg4'): the base station transmits a contention resolution message (with appropriate repetitions, if any) to a specific terminal.

However, the resources allocated for the MTC device 3-2 are shared by other MTC devices that belong to the same category. Accordingly, when more than one MTC devices initiate random access procedures substantially concurrently, the base station 5 needs to schedule appropriate resources for transmitting respective RAR messages (Msg2) to each such MTC device within a short time period (defined by the time window starting from Msg1).

In order to be able to respond to each MTC device, and to ensure that each MTC device knows which subband to monitor for its RAR message (even if the RA-RNTI is shared by a plurality of MTC devices), the base station 5 allocates (using its UE group allocation module 69) each MTC device to a group. Next, the base station 5 informs each group of MTC device about their respective allocated RAR resources via the EPDCCH (using an appropriately formatted DCI).

The eCSS comprises a common search space, using which the base station 5 is able to dynamically schedule (using its random access control module 67) RAR messages for communication devices 3 located within its cell. In order to do so, the base station 5 includes in the DCI format information indicating which subband (identified by its subband index) is scheduled for the PDSCH carrying the RAR message as well as the associated resource allocation (number of RBs) within that subband.

In more detail, subframes denoted 'x' and 'y' (in FIG. 4) include a respective eCSS 70 for those MTC devices that are scheduled to receive an RAR message from the base station 5 in one of the subsequent subframes (assuming cross-subframe scheduling is in place). Each MTC device (but at least those MTC devices that recently initiated a random access procedure) monitors the eCSS 70 by turning on their transceiver 31 (and tuning it to the subband carrying the eCSS 70) at least for the duration of the eCSS transmission (subframes x and y in FIG. 4).

The eCSS 70 includes one or more appropriate DCI(s), each of which comprises information identifying the subframe and the physical resource block (subband, timing) that carries the RAR for the MTC devices belonging to a particular group. Each MTC device that receives the eCSS transmission (via its associated eCSS module 44) is configured to determine (using its associated random access module 47) whether any received DCI is for the group of communication devices that that MTC belongs to.

In one option, the DCI indicates that the RAR message will be transmitted over the same subband 71 as the subband carrying the eCSS 70 but in a different subframe (subframe x+1 in the example shown in FIG. 4). In other words, the base station's 5 RAR transmissions use physical resource block(s) that fall within the subband 71 that the communication device's 3 transceiver circuit 31 is already tuned to (because it is tuned to receiving the eCSS in subframe x).

In accordance with another option, the DCI indicates that the RAR message will be transmitted over a different subband 71' than the subband carrying the eCSS 70. In this case, the DCI also indicates that the RAR message will be transmitted after an appropriate retuning time after the transmission of the eCSS 70. For example, the DCI may indicate that the RAR message will be transmitted in subframe x+2 (or later). Preferably, the RAR message is transmitted after subframe x+1 but prior to subframe y (carrying the next eCSS 70 transmission). By employing an appropriate retuning time, it is possible for the scheduled communication devices 3 to tune their transceiver circuit 31 (from the subband carrying the eCSS) to the subband carrying their respective RAR/paging message.

An advantage associated with scheduling RAR messages via the EPDCCH CSS is that the resulting scheduling flexibility contributes to an efficient system operation as well as reduces the blocking probability for RAR messages.

In addition, eCSS makes it possible to multiplex a number of RAR messages (e.g. RAR messages with the same coverage level) into a single TBS thus further improving system efficiency (e.g. by reducing the associated overhead). However, if such multiplexing is not appropriate (or not required), this approach also makes it possible to employ single (non-multiplexed) RAR message transmissions to at least some communication devices.

The above described dynamic scheduling via eCSS may also be used for scheduling message 4 of the random access procedure (when cross-subframe scheduling is in place). It will be appreciated that in this case, the DCI format also includes the subband used for transmitting Msg4.

<Operation—Paging>

FIG. 5 illustrates an exemplary way in which paging transmissions (with cross-subframe scheduling) can be employed in the communication system 1 shown in FIG. 1.

Similarly to the way in which RAR messages are scheduled (as described above with reference to FIG. 4), paging messages (that are transmitted over the PDSCH) may also be scheduled using the eCSS (transmitted over the EPDCCH). In this case, since the paging message size can vary (not fixed), the DCI format (included in the eCSS) preferably also includes information identifying at least one of: an MCS associated with the paging message; a TBS associated with the paging message; and a number of RBs allocated for the paging message.

If the frequency location for the PDSCH carrying the paging message is different to the frequency location for the eCSS, then cross-subframe scheduling is used. In this case, the paging message is scheduled for transmission over one of the available subbands (not exceeding 1.4 MHz/6 RBs) and the associated subband number (index) is also included in the DCI format. This approach beneficially increases scheduling flexibility at the base station 5 and may also decrease the blocking probability of the paging message.

As shown in FIG. 5, subframes denoted 'x' and 'y' each include a respective eCSS 70A, 70B for those MTC devices that are scheduled to receive a paging message from the base station 5 in one of the subsequent subframes (assuming cross-subframe scheduling is in place). Each MTC device monitors the eCSS 70 by turning on their transceiver circuit 31 (and tuning it to the subband carrying the eCSS 70) at least for the duration of the eCSS transmission (subframes x and y in FIG. 5).

The DCI included in the eCSS 70A (in subframe x) indicates that a paging message will be transmitted (after an appropriate retuning time) in subband 71A (identified by its associated subband index) for communication devices 3 identified as 'UE2', 'UE3', and 'UE5'. Similarly, the DCI included in the eCSS 70B (in subframe y) indicates that a paging message will be transmitted (after an appropriate retuning time) in subband 71B (identified by its associated subband index) for communication devices 3 identified as 'UE4', 'UE7', and 'UE8'.

Thus each identified communication devices 3 are able tune its transceiver circuit 31 to its respective allocated subband 71 (at least for the duration of the paging transmission) and listen to the paging messages broadcast in that subband 71.

However, each communication devices 3 is configured to tune its transceiver circuit 31 back to subband carrying the eCSS 70 after the paging message is transmitted (including any repetition if CE is used) so that they can continue to receive control information (DCI) from the base station 5 without delay.

Advantageously, the base station's 5 transmissions are scheduled such that there is sufficient retuning time provided after each paging message and before transmitting a subsequent eCSS (e.g. there is at least one subframe before each one of subframes x and y and the end of the preceding paging transmission).

<Modifications and Alternatives>

Detailed exemplary embodiments have been described above. As those skilled in the art will appreciate, a number of modifications and alternatives can be made to the above exemplary embodiments whilst still benefiting from the inventions embodied therein.

FIGS. 6 to 11 illustrate further exemplary ways in which broadcast transmissions (such as RAR transmissions) can be scheduled via the eCSS for bandwidth reduced MTC devices.

FIG. 6 illustrates a modification of the random access procedure in which RAR transmissions are scheduled via the eCSS. In this case, both the eCSS and Msg2 are always transmitted on the same subband.

In this example, each one of UE1 to UE6 has the same RA-RNTI. The base station allocates (using its UE group allocation module 69) UE1, UE2, and UE3 to a first group, and allocates UE4, UE5, and UE6 to a second group.

The eCSS transmitted in both subframe x and subframe y includes the RA-RNTI that is common to UE1 to UE6. However, in a first transmission round (in subframe x+1) scheduled via the eCSS transmitted in subframe x, the RAR includes preamble IDs for communication devices belonging to the first group. Accordingly, the RAR messages multiplexed into this message are intended for the UE1, UE2, and UE3 belonging to the first group. This also means that although communication devices belonging to the second group have also received and decoded the RAR message in subframe x+1, this message does not include their associated preamble IDs. Consequently, each communication devices belonging to the second group determines (using their associated random access module 47) that this RAR message does not include a valid response for that communication device, and continues monitoring the EPDCCH for further eCSS transmissions (i.e. in subframe y). On the other hand, the communication devices belonging to the first group determine that the RAR message in subframe x+1 includes a valid random access response, and proceed to generating and transmitting Msg3 to the base station.

In the next transmission round (in subframe y+1) scheduled via the eCSS transmitted in subframe y, the RAR includes preamble IDs for communication devices belonging to the second group. Thus in subframe y+1, the communication devices belonging to the second group also determine that the RAR message in subframe y+1 includes a valid random access response, and proceed to generating and transmitting Msg3 to the base station.

It will be appreciated that any group may include a single communication device, in which case no multiplexing is used for that group. It will also be appreciated that RAR messages for more than one groups may be multiplexed together.

Thus in this example RAR messages are multiplexed (if applicable) and transmitted on a per group basis in the time domain, using the same subband as the eCSS. Advantageously, there is no need to provide any retuning time and/or include a subband index in the DCI format, whilst still benefitting from some of the flexibility associated with the eCSS based RAR scheduling described with reference to FIG. 4.

FIG. 7 illustrates another modification of the random access procedure in which RAR transmissions are scheduled via the eCSS. In this case, RAR messages for different groups of communication devices are transmitted over different subbands.

In this case, a single TBS carrying one or more RAR messages with the same RA-RNTI (but for different communication devices) and with the same coverage level is scheduled on any subband. This means that the subband for the eCSS and the subband for the RAR messages may be different, hence scheduling flexibility can be achieved to some degree.

As can be seen, the eCSS included in subframe x schedules a (multiplexed) RAR transmission for the group of communication devices with identifiers UE1 to UE3 (but with the RA-RNTI that is common to other communication devices UE4 to UE6 as well). When a communication device that belongs to this group (e.g. UE1) decodes this RAR message, it determines that this RAR message comprises a valid random access response (since its selected preamble ID is included) and proceeds to transmitting Msg3 to the base station.

However, when a communication device that does not belong to this group (e.g. UE4) decodes this RAR message, it determines that this RAR message was not meant for this communication device (since its selected preamble ID is not included). Thus UE4 returns to monitoring for the eCSS in the EPDCCH.

Beneficially, the timing of the RAR transmissions and the eCSS are defined such that there is sufficient retuning time provided after each RAR message and before transmitting a subsequent eCSS (e.g. there is at least one subframe before each one of subframes x and y and the end of the preceding RAR transmission).

As can be seen, the RAR transmission for the group of communication devices with identifiers UE4 to UE6 are scheduled via the eCSS included in subframe y. However, this RAR transmission uses a different subband to the subband used for the RAR transmission scheduled via subframe x (although it may use the same subband). Thus in this example RAR messages (multiplexed, if applicable) are transmitted on a per group basis in the time domain (and possibly in the frequency domain as well). It will be appreciated that communication devices UE4 to UE6 may require a different CE level (and hence a different number of repetitions) to the CE level for communication devices UE1 to UE3.

FIG. 8 illustrates another modification of the random access procedure in which RAR transmissions are scheduled via the eCSS. In this case, RAR messages for all scheduled communication devices are transmitted over the same (albeit dynamically scheduled) subband.

In this case, all RAR messages with the same RA-RNTI (but for different communication devices) and with the same coverage level are scheduled on the same subband and arranged in sequence within a time window. This means that the subband for the eCSS and the subband for the RAR messages may be different, hence scheduling flexibility can be achieved to some degree. However, the transmission parameters for RAR messages arranged in a single sequence need to be the same (signalled by the same DCI format).

However, since a potentially large number of RAR messages need to be transmitted in a single sequence, the RAR transmission may in some cases exceed the capacity of a single subframe (using 6 RBs only). Therefore, in order to inform the communication devices that they should continue decoding from the indicated subband after the first subframe of the RAR transmission, a flag may be included in (at least) the final RAR message of the subframe to indicate that there is at least one further message after this message. It will be appreciated however, that such flag may be included in each RAR message that is followed by another RAR message (regardless whether the following RAR message is located in the same subframe or in the subsequent one).

In the example shown in FIG. 8, all communication devices (UE1 to UE6) are being scheduled via the eCSS included in subframe x. However, the respective RAR messages for communication devices with identifiers UE1 to UE3 are included in the first part of the (multiplexed) RAR transmission sequence and RAR message for the remaining communication devices are included in the second part of the RAR transmission sequence. It will be appreciated that the RAR transmission sequence may be repeated in accordance with the CE level required for the communication devices (UE1 to UE6) scheduled in this round.

FIG. 9 illustrates another modification of the random access procedure in which RAR transmissions are scheduled via the eCSS. In this case, however, the DCI format also identifies the preamble range covered in the RAR messages scheduled via that DCI format.

For example with 2 bits in the DCI format, four groups (each group comprising 16 preamble IDs) can be signalled.

In this example, UE1 (with preamble ID 10), UE2 (with preamble ID 3), UE3 (preamble ID 12), UE4 (preamble ID 14), UE5 (preamble ID 17), UE6 (preamble ID 19), UE7 (preamble ID22) and UE8 (preamble ID 31) have the same RA-RNTI. Assuming that the first group includes preamble IDs 1 to 16, the second group includes preamble IDs 17 to 32, the third group includes preamble IDs 33 to 48, and the fourth group includes preamble IDs 48 to 64; then UE1 to UE4 belong to the first group, and UE5 to UE8 belong to the second group.

Each communication device is configured to monitor for eCSS transmissions in the prescribed subframes and determine whether its selected preamble ID falls within the range identified by the DCI format. If it is determined that its selected preamble ID falls within the range identified by the DCI format, then the communication device is configured to retune its transceiver (following an appropriate retuning time) to the subband indicated by the DCI format and decode its associated Msg2 from the base station's RAR transmission.

As can be seen, beneficially, there is no need to provide any retuning time after the RAR transmissions and before the immediately following eCSS transmission, because only those communication devices need to monitor the eCSS, at any given time, that are not yet scheduled (based on their associated preamble ID) for transmission (e.g. RAR transmission and/or the like).

FIG. 10 illustrates a case without requiring multiplexing of multiple RAR messages (or when such multiplexing is not permitted). In this case, it is beneficial to apply a new RA-RNTI for each communication device (rather than the RA-RNTI that is derived in accordance with legacy procedures).

The legacy RA-RNTI has a range of '1' to '60' and is determined as follows:

$$RA\text{-}RNTI = 1 + t\_id + 10 * f\_id$$

where t_id is the index of the first subframe of the transmitted PRACH $$(0 \leq t\_id < 10); \qquad\qquad\qquad [\text{Math. 1}]$$

and f_id is the index of the transmitted PRACH in frequency domain of the same subframe $$(0 \leq f\_id < 6). \qquad\qquad\qquad [\text{Math. 2}]$$

In this modification, however, the RA-RNTI (at least for MTC devices) is derived by employing the PRACH sequence index as well. This will prevent using the same RA-RNTI for multiple communication devices (MTC devices) even if they select the same PRACH resources (t_id and f_id) for transmitting Msg1, unless also using the same PRACH sequence index. The value of this 'MTC RA-RNTI' or 'PRACH sequence index based RA-RNTI' may be chosen from outside (above) the legacy RA-RNTI range and may be determined as follows:

$$\text{RA-RNTI}=61+64*f\_id+\text{PRA}\_id$$

where PRA_id is the transmitted PRACH sequence index $$(0 \leq \text{PRA}\_id < 64);\qquad\text{[Math. 3]}$$

and f_id is the index of the transmitted PRACH in frequency domain of the same subframe $$(0 \leq f\_id < 6).\qquad\text{[Math. 4]}$$

Accordingly, if the DCI is masked with such a PRACH sequence specific RA-RNTI, then only the intended UE(s) (i.e. communication device(s) using the corresponding PRACH sequence index) will be able to decode it and receive the associated RAR message (after an appropriate retuning time). Any other UEs (that use a conventional RA-RNTI or an RA-RNTI based on a different PRACH sequence index) will not be able to decode such a DCI format that is not masked with their own RA-RNTI and hence such UEs skip (tuning to and) receiving the associated PDSCH. This may result in significant power savings.

Beneficially, this approach involving the new RA-RNTI may also result in reduced power consumption (power saving) at the MTC device, at least while the MTC device is operating in coverage enhanced mode.

FIG. 11 illustrates a case in which the RA-RNTI is determined based on PRACH (preamble) sequence grouping. In this case the RA-RNTI is derived using the PRACH sequence group index (assuming 4 groups) as follows:

$$\text{RA-RNTI}=61+4*f\_id+\text{PRA}\_\text{Group}\_id$$

where PRA_Group_id is the index of the PRACH sequence group $$(0 \leq \text{PRA}\_\text{Group}\_id < 4)\qquad\text{[Math. 5]}$$

in which the UE's PRACH (preamble) sequence index belongs to. A possible preamble sequence ID grouping has been described above with reference to FIG. 9 (although any suitable grouping may be used).

Accordingly, if the DCI is masked with such a group-specific RA-RNTI, then only the intended UEs (i.e. communication device(s) using a preamble sequence ID from the same group) will be able to decode it and receive the associated RAR message (after an appropriate retuning time). Any other UEs (that selected their respective PRACH sequence index from a different group) will not be able to decode such a DCI format that is intended for a different group than their own and hence such UEs skip (tuning to and) receiving the associated PDSCH. This approach may thus result in significant power savings.

Alternatively, the subframe index (t_id) may also be included in the equation, for example, as follows:

$$\text{RA-RNTI}=61+t\_id+64*f\_id+\text{PRA}\_id$$

where PRA_id is the transmitted PRACH sequence index $$(0 \leq \text{PRA}\_id < 64),\qquad\text{[Math. 6]}$$

f_id is the index of the transmitted PRACH in frequency domain of the same subframe $$(0 \leq f\_id < 6)\qquad\text{[Math. 7]}$$

and t_id is the index of the first subframe of the transmitted PRACH $$(0 \leq t\_id < 10).\qquad\text{[Math. 8]}$$

In the above exemplary embodiments, control data (DCI) transmitted via the eCSS is used for scheduling a (multiplexed) broadcast transmission, such as RAR or paging message transmission. However, it will be appreciated that a control-less RAR message may be used instead. In this case, the number of PRBs is fixed to 6 RBs (or less). The base station transmits (RAR/paging) messages using a single TBS (or a limited set of TBS) and the communication devices are configured to perform a number of blind decodings based on the TBS. The frequency location or subband for the RAR messages may be fixed to e.g. the central 6 RBs (although it may also be derived from PRACH resources). Although in this option the base station's scheduling flexibility is restricted (as the frequency location may not be changed dynamically) and the UE's power consumption may increase (due to blind decoding of all messages), there is no need for the provision of any retuning time before transmissions (since there is no control data). Beneficially, when a number of RAR messages need to be transmitted on the same subband, a queueing mechanism may also be provided to ensure that RAR messages are transmitted within their respective detection window (calculated from Msg1).

In the above exemplary embodiments, a number of ways are given for cross-subframe scheduling of broadcast transmissions, such as RAR (message 2 of the random access procedure) and paging messages. However, it will be appreciated that the above embodiments may also be applicable to other messages, for example message 4 of the random access procedure (even though message 4 is masked with an identifier (TC-RNTI) that is uniquely associated with one UE only.

FIGS. 4 to 11 show three subbands (each subband comprising 6 RB). However, it will be appreciated that the number of subbands can be more (or less) than three (e.g. depending on the base station's system bandwidth).

In the above exemplary embodiments, the retuning time is assumed to be (not more than) one subframe in duration. However, it will be appreciated that a different retuning time (e.g. more than one subframe) may also be employed.

In the above description, repetition in time domain is assumed for all transmissions. However, such repetitions are omitted in FIGS. 4 to 11 for simplicity.

A number of exemplary embodiments have been described above, with reference to FIGS. 4 to 11. It will be appreciated that these exemplary embodiments are not mutually exclusive and any of the options may be combined within the same system, either within a single cell and/or in neighbouring cells. For example, the base station may be configured to change from one operation mode to another, e.g. periodically, in dependence on the number/type of MTC devices in its cell, in dependence on the overall load in the cell, in dependence on the number of preamble retransmissions (e.g. due to collision), in dependence on the type of communication (e.g. random access/paging/broadcast/unicast), and/or the like.

In the above examples described with reference to FIGS. 10 and 11, the RA-RNTI is calculated without using the subframe index identifying the subframe in which the preamble prefix (Msg1) was transmitted. However, it will be appreciated that the index of the subframe in which Msg1 was transmitted is still considered (by the base station and the MTC device) at least in determining an appropriate time window within which Msg2 needs to be transmitted.

In the above description, information relating to the PRACH configuration is signalled via the SIB2. However, it will be appreciated that the PRACH configuration (at least part of it) may be signalled via a different system information block, for example, via one or more SIB specific to reduced bandwidth UEs and/or coverage enhanced UEs. Alternatively or additionally, some or all of this information can be obtained by the communication devices in a different manner—for example the PRACH configuration may be signalled via system broadcast (e.g. PBCH) and/or via higher layers (e.g. RRC).

It will be appreciated that although the communication system is described in terms of the base station operating as a E-UTRAN base station (eNB), the same principles may be applied to base stations operating as macro or pico base stations, femto base stations, relay nodes providing elements of base station functionality, home base stations (HeNB), or other such communication nodes.

In the above exemplary embodiments, an LIE telecommunications system was described. As those skilled in the art will appreciate, the techniques described in the present application can be employed in other communications systems, including earlier 3GPP type systems. Other communications nodes or devices may include user devices such as, for example, personal digital assistants, laptop computers, web browsers, etc.

In the exemplary embodiments described above, the base station and the communication device each include transceiver circuitry. Typically, this circuitry will be formed by dedicated hardware circuits. However, in some exemplary embodiments, part of the transceiver circuitry may be implemented as software run by the corresponding controller.

In the above exemplary embodiments, a number of software modules were described. As those skilled in the art will appreciate, the software modules may be provided in compiled or un-compiled form and may be supplied to the base station or the user device as a signal over a computer network, or on a recording medium. Further, the functionality performed by part or all of this software may be performed using one or more dedicated hardware circuits.

The base station may comprise: a processor configured to identify at least one subframe in which a broadcast message, carrying information for at least one communication device, is to be broadcast; a transmitter configured for: transmitting, in a control channel, in a frequency subband in at least one subframe that precedes said at least one subframe in which said broadcast message is to be broadcast, control information to identify said at least one subframe in which said broadcast message is to be broadcast; and broadcasting said broadcast message in said at least one subframe in which said broadcast message is to be broadcast.

The at least one communication device may comprise at least one machine type communication 'MTC' device (e.g. a reduced bandwidth or low complexity MTC device and/or a coverage enhanced MTC device).

If the at least one communication device comprises at least one coverage enhanced MTC device, the at least one subframe in which said control information is transmitted may comprise a plurality of subframes in which said control information is to be first transmitted and then repeated, and said at least one subframe in which a broadcast message is to be broadcast may comprise a plurality of subframes in which said broadcast message is to be first broadcast and then repeated.

The broadcast message may carry multiplexed information for each of a plurality of communication devices. For example, the broadcast message may carry multiplexed information for each of a plurality of coverage enhanced machine type communication 'MTC' devices sharing a common coverage enhancement level.

The processor may be further configured to identify a frequency subband in which the broadcast message is to be broadcast. In this case the control information may be arranged to identify said frequency subband in which said broadcast message is to be broadcast; and said transmitter may be configured for broadcasting said broadcast message in said frequency subband in which said broadcast message is to be broadcast.

The processor may be further configured to identify at least one frequency resource (e.g. at least one physical resource block), within said frequency subband, on which said broadcast message is to be broadcast; said control information may be arranged to identify said at least one frequency resource; and said transmitter may be configured for broadcasting said broadcast message on said at least one frequency resource.

The frequency subband in which said broadcast message is to be broadcast and the frequency subband in which said control channel is transmitted may be different to one another. In this case said processor may be configured to identify said at least one subframe in which said broadcast message is to be broadcast such that there is at least one further subframe between the at least one subframe in which said control channel is transmitted and said at least one subframe in which said broadcast message is to be broadcast (e.g. between the last subframe in which control information is repeated and the first subframe in which said broadcast message is first broadcast).

The frequency subband in which said broadcast message is to be broadcast and the frequency subband in which said control channel is transmitted may be the same. In this case the processor may be configured to identify said at least one subframe in which said broadcast message is to be broadcast such that there is no whole subframe between the, or a last subframe of the, at least one subframe in which said control channel is transmitted and the, or a first subframe of said at least one subframe in which said broadcast message is to be broadcast.

The broadcast message may carry an indicator that a further broadcast message will follow in a subframe subsequent to (e.g. that immediately follows) the at least one subframe in which said broadcast message is to be broadcast.

The control information may comprise information for identifying the at least one device that said broadcast message carries information for. In this case, the information for identifying may comprise at least one of: a group identifier for identifying a group of devices of which said at least one device that said broadcast message carries information for is a member; at least one preamble sequence identifier for identifying said at least one device that said broadcast message carries information for; and an identifier of a coverage enhancement level associated with the at least one device that said broadcast message carries information for.

The base station may further comprise a receiver for receiving, from said at least one communication device, a message carrying a random access preamble, wherein said broadcast message comprises a message, carrying a random access response 'RAR' for said at least one communication device.

The control information may comprise information for identifying the at least one device that said broadcast message carries information for. For example, the information for identifying the at least one device may comprise an identifier that equals 61+64×f_id+PRA_id; where f_id may be an index of a frequency resource block on which said message carrying a random access preamble was received and PRA_id may be a preamble sequence index. The information for identifying the at least one device may also comprise an identifier that equals 61+4×f_id+PRA_Group_id; where f_id may be an index of a frequency resource block on which said message carrying a random access preamble was received and PRA_Group_id may be an index of a preamble sequence group of which said at least one device that said broadcast message carries information for is a member. The information for identifying the at least one device may also comprise an identifier that equals RA-RNTI=61+t_id+64×f_id+PRA_id; where t_id is an index of a subframe in which said message carrying a random access preamble was received, f_id is an index of a frequency resource block on which said message carrying a random access preamble was received, and PRA_id is a preamble sequence index The broadcast message may comprise a paging message broadcast using a paging channel.

The processor may be further configured to identify a modulation and coding scheme 'MCS' and/or transport block size 'TBS' for said paging message. The control information may be arranged to identify said MCS and/or TBS.

In the above exemplary embodiments, machine-type communication devices and mobile telephones are described. However, it will be appreciated that mobile telephones (and similar user equipment) may also be configured to operate as machine-type communication devices. For example, the mobile telephone 3-1 may include (and/or provide the functionality of) the MTC module 45.

Examples of MTC Applications

It will be appreciated that each communication device may support one or more MTC applications. Some examples of MTC applications are listed in the following table (source: 3GPP TS 22.368 V13.1.0, Annex B). This list is not exhaustive and is intended to be indicative of the scope of machine-type communication applications.

TABLE 1

| Service Area | MTC applications |
| --- | --- |
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |

TABLE 1-continued

| Service Area | MTC applications |
| --- | --- |
| Consumer Devices | Digital photo frame |
| | Digital camera |
| | eBook |

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

1 Introduction

In the current RAN1 agreements, cross-subframe scheduling is supported for unicast transmission (i.e. PDSCH for single UE). However, the scheduling methods for broadcast transmission (i.e. RAR and Paging) has not been discussed yet.

In this contribution, we discuss the transmission of RAR messages and paging for LTE Rel-13 MTC and provide some proposals at the end.

2 Random Access Response (RAR) Transmission

For MTC, the random access (RA) procedure is the same as legacy LTE system which involves transmission of four messages (msg1-4). However, initially, MTC UE should estimate the coverage level (0-3) based on some criteria for example using downlink RSRP measurements in order to determine the number of repetitions for PRACH message 1. Then, UE should select one of the PRACH resources allocated for that coverage level and start random access procedure. eNB can determine the coverage level from the PRACH resource used by the UE as there is one to one mapping between PRACH resource set and PRACH repetition level. For the random access response (RAR) message 2, it seems there are two different ways of scheduling to the UEs as follows:

Option 1: Control-less RAR message—In this case, the number of PRBs can be fixed to 6 RBs, single TBS or limited set of TBS can be used where UE always tries a number of blind decodings. The frequency location or subband for RAR messages can be fixed to center 6 RBs or can be derived from PRACH resources. The main concern is that this option lacks eNB scheduling flexibility as the frequency location cannot be changed dynamically and it could also result a higher blocking probability for RAR messages. In addition, in case a number of RAR messages end up on the same subband, some kind of queueing will be necessary where UE tries to decode each RAR message carried by PDSCH in the detection window. Hence, the power consumption at the UE will be increased significantly.

Option 2: RAP message on EPDCCH CSS—another option is to define common search space (eCSS) in EPDCCH to provide dynamic scheduling for RAR messages where number of PRBs, TBS and frequency locations, etc. are included in the DCI format. The disadvantage is the control overhead compare to Option 1 more specifically for coverage enhanced mode where significant number of repetitions are needed for eCSS transmission. The advantage is the eNodeB scheduling flexibility that achieves an efficient system operation as well as reducing the blocking probability for RAR messages. In addition, it is possible to multiplex a number of RAR messages which have same coverage level into a single TBS similar to Rel-8. If multiple messages are multiplexed, the payload will increase and as a consequence the number of repetitions in time domain will increase for a given coverage level. So, in order to get a right balance, it is beneficial eNB to control the number of messages that can be multiplexed depending on coverage level. For example, RAR messages for low complexity MTC UEs in normal coverage can be multiplexed while enhanced coverage mode (e.g. 5 dB, 10 dB and 15 dB) single RAR message transmission is preferable.

Furthermore, in order to reduce the power consumption at the UE, a new MTC RA-RNTI may be necessary at least for coverage enhanced mode. The legacy RA-RNTI has a range of 1 to 60 and is determined as follows:

RA-RNTI=1+$t\_id$+10*$f\_id$ where $t\_id$=index of the first subframe of the transmitted PRACH (0≤$t\_id$<10)  [Math. 9]

and $f\_id$=index of the transmitted PRACH infrequency domain of the same subframe (0≤$f\_id$<6).  [Math. 10]

One way is to re-think how RA-RNTI is derived by employing PRACH sequence index as an RA-RNTI. This will detach the new MTC RA-RNTI from multiple UEs even if they select same $t\_id$ and $f\_id$ unless they pick up same PRACH sequence index. The new MTC RA-RNTI can be placed above the legacy RA-RNTI range and can be determined as follows:

RA-RNTI=61+64*$f\_id$+PRA_$id$ where PRA_$id$=the transmitted PRACH sequence index (0≤PRA_$id$<64).  [Math. 11]

So, if DCI is masked with sequence-specific RA-RNTI only intended UE(s) will be able to receive, and other un-intended UEs will not be able to decode the DCI format and subsequently will skip the associated PDSCH which will lead a significant power saving. Therefore, from power saving perspective at the UE, Option 2 is preferable.

Observation 1: If new MTC RA-RNTI is employed based on PRACH sequence index, from power saving perspective at the UE, Option 2 (EPDCCH CSS) is preferable for RAR messages.

Observation 2: For normal coverage, multiple RAR messages can be multiplexed together under the eNB control, however, for enhanced coverage mode (e.g. 5 dB, 10 dB and 15 dB), single RAR message transmission should be supported.

Proposal 1: EPDCCH CSS should be used for RA message 2 and 4 transmission

If EPDCCH CSS is adapted for RA messages, time domain repetition will be necessary for both normal and enhanced coverage mode. In addition, the scheduled subband index in frequency domain should be included in the DCI format in order to achieve eNB scheduling flexibility. Hence, as shown in FIG. 4, dynamic scheduling via eCSS for RA message 2/4 using cross-subframe scheduling should be supported for all MTC UEs.

Proposal 2: Cross-subframe scheduling is supported for RA message 2 and 4.

3 Paging Transmission

The paging message is variable as the IDs of multiple UEs can be multiplexed. Therefore, it is desirable to signal TBS in the DCI format that is transmitted on the eCSS. In addition, for PDSCH carrying paging message, it is beneficial that the subband index in frequency location should be selected dynamically from the available sub-bands by utilizing cross-subframe scheduling as shown in FIG. 5. This will increase scheduling flexibility at the eNB and also decrease the blocking probability of the paging messages.

Proposal 3: EPDCCH CSS should be used for Paging transmission

Proposal 4: Cross-subframe scheduling is supported for Paging transmission.

4 Conclusion

In this contribution, we have discussed the transmission of RAR messages and paging for LTE Rel-13 MTC and we have the following observations and proposals.

Observation 1: If new MTC RA-RNTI is employed based on PRACH sequence index, from power saving perspective at the UE, Option 2 (EPDCCH CSS) is preferable for RAR messages.

Observation 2: For enhanced coverage mode (e.g. 5 dB, 10 dB and 15 dB), single RAR message transmission should be supported. However, for normal coverage, multiple RAR messages can be multiplexed together under the eNB control.

Proposal 1: EPDCCH CSS should be used for RA message 2, 4 and Paging transmission Proposal 2: Cross-subframe scheduling is supported for RA message 2, 4 and Paging transmission 5 References 1) 3GPP TR 36.888 V12.0.0, "Study on provision of low-cost MTC UEs based on LTE (Release-12)".
2) RP-150492, "Revised WI: Further LIE Physical Layer Enhancements for MTC", Ericsson, RAN #67
3) R1-151555, "Further details of Physical Downlink Control Channel for MTC", NEC, RAN1 #80bis The whole or part of the exemplary embodiments disclosed above can be described as, but not limited to, the following supplementary notes.

(Supplementary note 1). A base station for a communication system in which communication devices communicate via said base station using radio frames made up of a sequence of subframes and a frequency band made up of frequency subbands, the base station comprising: a processor configured to identify at least one subframe in which a broadcast message, carrying information for at least one communication device, is to be broadcast;

a transmitter configured for:

transmitting, in a control channel, in a frequency subband in at least one subframe that precedes said at least one subframe in which said broadcast message is to be broadcast, control information to identify said at least one subframe in which said broadcast message is to be broadcast; and broadcasting said broadcast message in said at least one subframe in which said broadcast message is to be broadcast.

(Supplementary note 2). The base station according to Supplementary note 1, wherein said at least one communication device comprises at least one coverage enhanced machine type communication 'MTC' device, wherein said at least one subframe in which said control information is transmitted comprises a plurality of subframes in which said control information is to be first transmitted and then repeated, and wherein said at least one subframe in which a broadcast message is to be broadcast comprises a plurality of subframes in which said broadcast message is to be first broadcast and then repeated.

(Supplementary note 3). The base station according to Supplementary note 1 or 2, wherein said broadcast message carries multiplexed information for each of a plurality of communication devices.

(Supplementary note 4). The base station according to Supplementary note 3, wherein said broadcast message carries multiplexed information for each of a plurality of coverage enhanced machine type communication 'MTC' devices sharing a common coverage enhancement level.

(Supplementary note 5). The base station according to any one of Supplementary notes 1 to 4, wherein said processor is further configured to identify a frequency subband in which said broadcast message is to be broadcast; wherein said control information is arranged to identify said frequency subband in which said broadcast message is to be broadcast; and wherein said transmitter is configured for broadcasting said broadcast message in said frequency subband in which said broadcast message is to be broadcast.

(Supplementary note 6). The base station according to Supplementary note 5, wherein said processor is further configured to identify at least one frequency resource (e.g. at least one physical resource block), within said frequency subband, on which said broadcast message is to be broadcast; wherein said control information is arranged to identify said at least one frequency resource; and wherein said transmitter is configured for broadcasting said broadcast message on said at least one frequency resource.

(Supplementary note 7). The base station according to Supplementary note 5 or 6, wherein when said frequency subband in which said broadcast message is to be broadcast and said frequency subband in which said control channel is transmitted are different to one another, said processor is configured to identify said at least one subframe in which said broadcast message is to be broadcast such that there is at least one further subframe between the at least one subframe in which said control channel is transmitted and said at least one subframe in which said broadcast message is to be broadcast (e.g. between the last subframe in which control information is repeated and the first subframe in which said broadcast message is first broadcast).

(Supplementary note 8). The base station according to any one of Supplementary notes 5 to 7, wherein when said frequency subband in which said broadcast message is to be broadcast and said frequency subband in which said control channel is transmitted are the same, said processor is configured to identify said at least one subframe in which said broadcast message is to be broadcast such that there is no whole subframe between the, or a last subframe of the, at least one subframe in which said control channel is transmitted and the, or a first subframe of said at least one subframe in which said broadcast message is to be broadcast.

(Supplementary note 9). The base station according to any one of Supplementary notes 1 to 8, wherein said broadcast message carries an indicator that a further broadcast message will follow in a subframe subsequent to (e.g. that immediately follows) the at least one subframe in which said broadcast message is to be broadcast.

(Supplementary note 10). The base station according to any one of Supplementary notes 1 to 9, wherein said control information comprises information for identifying the at least one communication device that said broadcast message carries information for.

(Supplementary note 11). The base station according to Supplementary note 10, wherein said information for identifying comprises at least one of: a group identifier for identifying a group of devices of which said at least one communication device that said broadcast message carries information for is a member; at least one preamble sequence identifier for identifying said at least one communication device that said broadcast message carries information for; and an identifier of a coverage enhancement level associated with the at least one communication device that said broadcast message carries information for.

(Supplementary note 12). The base station according to any one of Supplementary notes 1 to 11, further comprising a receiver for receiving, from said at least one communication device, a message carrying a random access preamble, wherein said broadcast message comprises a message, carrying a random access response 'RAR' for said at least one communication device.

(Supplementary note 13). The base station according to Supplementary note 12, wherein said control information comprises information for identifying the at least one communication device that said broadcast message carries information for and wherein said information for identifying comprises an identifier that equals $61+64 \times f\_id+PRA\_id$; where $f\_id$ is an index of a frequency resource block on which said message carrying a random access preamble was received and $PRA\_id$ is a preamble sequence index.

(Supplementary note 14). The base station according to Supplementary note 12, wherein said control information comprises information for identifying the at least one communication device that said broadcast message carries information for and wherein said information for identifying comprises an identifier that equals $61+4 \times f\_id+PRA\_Group\_id$; where $f\_id$ is an index of a frequency resource block on which said message carrying a random access preamble was received and $PRA\_Group\_id$ is an index of a preamble sequence group of which said at least one communication device that said broadcast message carries information for is a member.

(Supplementary note 15). The base station according to Supplementary note 12, wherein said control information comprises information for identifying the at least one communication device that said broadcast message carries information for and wherein said information for identifying comprises an identifier that equals $RA\text{-}RNTI=61+t\_id+64 \times f\_id+PRA\_id$; where $t\_id$ is an index of a subframe in which said message carrying a random access preamble was received, $f\_id$ is an index of a frequency resource block on which said message carrying a random access preamble was received, and $PRA\_id$ is a preamble sequence index.

(Supplementary note 16). The base station according to any one of Supplementary notes 1 to 11, wherein said broadcast message comprises a paging message broadcast using a paging channel.

(Supplementary note 17). The base station according to Supplementary note 16, wherein said processor is further configured to identify a modulation and coding scheme 'MCS' and/or transport block size 'TBS' for said paging message wherein said control information is arranged to identify said MCS and/or TBS.

(Supplementary note 18). The base station according to any one of Supplementary notes 1 to 17, wherein said at least one communication device comprises at least one machine type communication 'MTC' device (e.g. a reduced bandwidth or low complexity MTC device and/or a coverage enhanced MTC device).

(Supplementary note 19). A communication device for communicating with a base station using radio frames made up of a sequence of subframes and a frequency band made up of frequency subbands, the communication device comprising:
 a receiver configured for receiving, in a control channel, in a frequency subband in at least one subframe, control information to identify at least one later subframe in which a broadcast message is to be broadcast; and
 a processor configured to identify, from said control information, said at least one later subframe in which said broadcast message is to be broadcast;
 wherein said processor is configured to control said receiver to monitor said at least one later subframe in which said broadcast message is to be broadcast for said broadcast message and to receive said broadcast message when it has been broadcast.

(Supplementary note 20). A system comprising the base station according to any one of Supplementary notes 1 to 18 and the communication device according to Supplementary note 19.

(Supplementary note 21). A method performed by a base station in a communication system in which communication devices communicate via said base station using radio frames made up of a sequence of subframes and a frequency band made up of frequency subbands, the method comprising:
 identifying at least one subframe in which a broadcast message, carrying information for at least one communication device, is to be broadcast;
 transmitting, in a control channel, in a frequency subband in at least one subframe that precedes said at least one subframe in which said broadcast message is to be broadcast, control information to identify said at least one subframe in which said broadcast message is to be broadcast; and
 broadcasting said broadcast message in said at least one subframe in which said broadcast message is to be broadcast.

(Supplementary note 22). A method performed by a communication device for communicating with a base station using radio frames made up of a sequence of subframes and a frequency band made up of frequency subbands, the method comprising:
 receiving, in a control channel, in a frequency subband in at least one subframe, control information to identify at least one later subframe in which a broadcast message is to be broadcast;
 identifying, from said control information, said at least one subframe in which said broadcast message is to be broadcast; and
 monitoring said at least one later subframe in which said broadcast message is to be broadcast for said broadcast message and receiving said broadcast message when it has been broadcast.

(Supplementary note 23). A computer implementable instructions product comprising computer implementable instructions for causing a programmable communications device to perform the method of Supplementary note 21 or 22.

This application is based upon and claims the benefit of priority from United Kingdom Patent Application No. 1506151.8, filed on Apr. 10, 2015, the disclosure of which is incorporated herein in its entirety by reference.

The invention claimed is:

1. A method performed by a user equipment (UE) which communicates with a base station, the method comprising;
 receiving a first parameter and a second parameter;
 transmitting a first message;
 receiving, in at least one subframe, a physical downlink control channel based on the first parameter and the second parameter; and
 decoding a physical downlink shared channel associated with the physical downlink control channel, based on information in the physical downlink control channel,
 wherein the physical downlink shared channel is provided in a further at least one subframe, subsequent to a last subframe in which the physical downlink control channel corresponding to the physical downlink shared channel is provided,
 wherein the further at least one subframe is determined based on a downlink control information (DCI) field,
 wherein the first parameter is related to at least one downlink sub-frame across which the physical downlink control channel is received, and
 wherein the second parameter is related to at least one narrow band for the physical downlink control channel.

2. The method according to claim 1, wherein the physical downlink control channel and the physical downlink shared channel are in a second message.

3. The method according to claim 1, wherein the method further comprises transmitting a third message based on information in the physical downlink shared channel, wherein the information in the physical downlink shared channel comprises a third parameter which is related to at least one part of band to transmit the third message.

4. The method according to claim 1, wherein the physical control channel comprises a third parameter which is related to repetition of the downlink shared channel.

5. The method according to claim 1, wherein the information in the physical downlink shared channel further comprises a fourth parameter which is related to at least one part of band to receive a fourth message.

6. The method according to claim 5, wherein the fourth parameter is a narrow band index.

7. The method according to claim 1, wherein the first parameter is received by using System Information Block (SIB).

8. The method according to claim 1, wherein the second parameter is received by using another SIB.

9. The method according to claim 1, wherein the physical control channel for the UE is multiplexed with physical downlink control channels for other UEs.

10. The method according to claim 1, wherein the physical downlink shared channel for the UE comprises a multiplexed data of other UEs.

11. A method performed by a base station which communicates with a user equipment (UE), the method comprising;
 transmitting a first parameter and a second parameter;
 receiving a first message;
 transmitting, in at least one subframe, a physical downlink control channel based on the first parameter and the second parameter; and transmitting a physical downlink shared channel associated with the physical downlink control channel, wherein the physical downlink shared channel is provided in a further at least one subframe, subsequent to a last subframe in which the physical downlink control channel corresponding to the physical downlink shared channel is provided, wherein the further at least one subframe is determined based on a downlink control information (DCI) field;

wherein the first parameter is related to at least one downlink subframe across which the physical downlink control channel is received, and wherein the second parameter is related to at least one narrow band for the physical downlink control channel.

12. A user equipment (UE) which communicates with a base station, the UE comprising;
- a receiver configured to receive a first parameter and a second parameter;
- a transmitter for transmitting a first message; and
- a controller,
- wherein the receiver is further configured to receive, in at least one subframe, a physical downlink control channel based on the first parameter and the second parameter,
- wherein the controller is configured to decode a physical downlink shared channel associated with the physical downlink control channel, based on information in the physical downlink control channel,
- wherein the physical downlink shared channel is provided in a further at least one subframe, subsequent to a last subframe in which the physical downlink control channel corresponding to the physical downlink shared channel is provided,
- wherein the further at least one subframe is determined based on a downlink control information (DCI) field;
- wherein the first parameter is related to at least one downlink sub-frame across which the physical downlink control channel is received, and
- wherein the second parameter is related to at least one narrow band for the physical downlink control channel.

13. The UE according to claim 12, wherein the physical downlink control channel and the physical downlink shared channel are in a second message.

14. The UE according to claim 12, wherein the UE further comprises means for transmitting a third message based on information in the physical downlink shared channel, wherein the information in the physical downlink shared channel comprises a third parameter which is related to at least one narrow band to transmit the third message.

15. The UE according to claim 12, wherein the physical downlink control channel comprises a third parameter which is related to repetition of the physical downlink shared channel.

16. The UE according to claim 12, wherein the information in the physical downlink shared channel further comprises a fourth parameter which is related to at least one narrow band to receive a fourth message.

17. The UE according to claim 16, wherein the fourth parameter is a narrow band index.

18. The UE according to claim 12, wherein the first parameter is received by using System Information Block (SIB).

19. The UE according to claim 18, wherein the second parameter is received by using another SIB.

20. The UE according to claim 12, wherein the physical downlink control channel for the UE is multiplexed with physical downlink control channels for other UEs.

21. The UE according to claim 12, wherein the physical downlink shared channel for the UE comprises a multiplexed data of other UEs.

22. A base station which communicates with a user equipment (UE), the base station comprising;
- a transmitter configured to transmit a first parameter and a second parameter; and
- a receiver configured to receive a first message;
- wherein the transmitter is further configured to transmit, in at least one subframe, a physical downlink control channel based on the first parameter and the second parameter,
- wherein the transmitter is further configured to transmit a physical downlink shared channel associated with the control channel,
- wherein the physical downlink shared channel is provided in a further at least one subframe, subsequent to a last subframe in which the physical downlink control channel corresponding to the physical downlink shared channel is provided,
- wherein the further at least one subframe is determined based on a downlink control information (DCI) field,
- wherein the first parameter is related to at least one sub-frame across which the physical downlink control channel is received, and
- wherein the second parameter is related to at least one narrow band for the physical downlink control channel.

* * * * *